US008296434B1

(12) United States Patent
Miller et al.

(10) Patent No.: US 8,296,434 B1
(45) Date of Patent: Oct. 23, 2012

(54) PROVIDING DYNAMICALLY SCALING COMPUTING LOAD BALANCING

(75) Inventors: Kevin Christopher Miller, Herndon, VA (US); Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 533 days.

(21) Appl. No.: 12/474,145

(22) Filed: May 28, 2009

(51) Int. Cl.
*G06F 15/173* (2006.01)
*G06F 15/177* (2006.01)

(52) U.S. Cl. .................... 709/226; 709/220; 709/224

(58) Field of Classification Search .................. 709/226, 709/220, 224
See application file for complete search history.

(56) References Cited

U.S. PATENT DOCUMENTS

| | | | |
|---|---|---|---|
| 7,870,044 B2 * | 1/2011 | Robertson | 705/34 |
| 7,886,021 B2 * | 2/2011 | Scheifler et al. | 709/217 |
| 2009/0276771 A1 * | 11/2009 | Nickolov et al. | 717/177 |
| 2010/0057913 A1 * | 3/2010 | DeHaan | 709/226 |
| 2010/0250748 A1 * | 9/2010 | Sivasubramanian et al. | 709/226 |
| 2010/0251242 A1 * | 9/2010 | Sivasubramanian et al. | 718/100 |
| 2010/0257252 A1 * | 10/2010 | Dougherty et al. | 709/217 |
| 2011/0004565 A1 * | 1/2011 | Stephenson et al. | 705/348 |

OTHER PUBLICATIONS

Open Virtualization Format, retrieved on Apr. 21, 2009, from http://www.vmware.com/appliances/learn/ovf.html, 1 page.
The Open Virtual Machine Format—Whitepaper for OVF Specification, v0.9, 2007, retrieved on May 28, 2009, from http://www.vmware.com/pdf/ovf_whitepaper_specification.pdf, 16 pages.
Open Virtualization Format White Paper, v.1.0.0, Feb. 6, 2009, retrieved on May 28, 2009, from http://www.dmtf.org/standards/published_documents/DSP2017_1.0.0.pdf, 39 pages.
Cohesive Flexible Technologies—VcubeV, retrieved Dec. 9, 2008, from http://www.cohesiveft.com/Developer/, 1 page.
Cohesive Flexible Technologies—VPN-Cubed, retrieved Dec. 9, 2008, from http://www.cohesiveft.com/vpncubed/, 2 pages.
CohesiveFT Elastic Server: VPN-Cubed: Technical Overview, retrieved Dec. 9, 2008, from http://blog.elasticserver.com/2008/12/vpn-cubed-technical-overview.html, 4 pages.
Cohesive Flexible Technologies—CohesiveFT FAQ, retrieved Dec. 9, 2008, from http://www.cohesiveft.com/FAQ/, 10 pages.
Enomalism: Elastic Computing Platform—Virtual Server Management: Home—True Elastic Computing, retrieved Aug. 26, 2008, from http://www.enomalism.com/, 2 pages.

(Continued)

*Primary Examiner* — Minh-Chau Nguyen
(74) *Attorney, Agent, or Firm* — Seed IP Law Group PLLC

(57) ABSTRACT

Techniques are described for providing load balancing functionality among multiple computing nodes. In some situations, the provided load balancing functionality includes dynamically scaling a group of multiple computing nodes for which the load balancing is performed, such as to dynamically expand and/or shrink the quantity of computing nodes in the group based on predefined criteria. At least some of the computing nodes of a group may be part of one or more physical computer networks in one or more geographical locations under control of a user or other entity, and at least some of the dynamic scaling of the group may use one or more other computing nodes that are part of a remote computer network (e.g., a virtual computer network provided under the control of a network-accessible service). The defined criteria used for the dynamic scaling may be determined in various manners and based on various factors.

33 Claims, 7 Drawing Sheets

OTHER PUBLICATIONS

Enomalism: Elastic Computing Platform—Virtual Server Management: Home—Open Source Cloud Computing, retrieved Aug. 26, 2008, from http://www.enomalism.com/, 2 pages.

Cohen, R., "ElasticVapor :: Life in the Cloud—Virtual Private Cloud (VPC)," Thursday, May 8, 2008, retrieved Aug. 26, 2008, from http://elasticvapor.com/search/label/Virtualization, 6 pages.

* cited by examiner

PROVIDING DYNAMICALLY SCALING COMPUTING LOAD BALANCING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided some benefits with respect to managing large-scale computing resources for many customers with diverse needs, allowing various computing resources to be efficiently and securely shared by multiple customers. For example, virtualization technologies, such as those provided by VMWare, XEN, Linux's KVM ("Kernel-based Virtual Machine"), or User-Mode Linux, may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

DETAILED DESCRIPTION

Figure 1A:
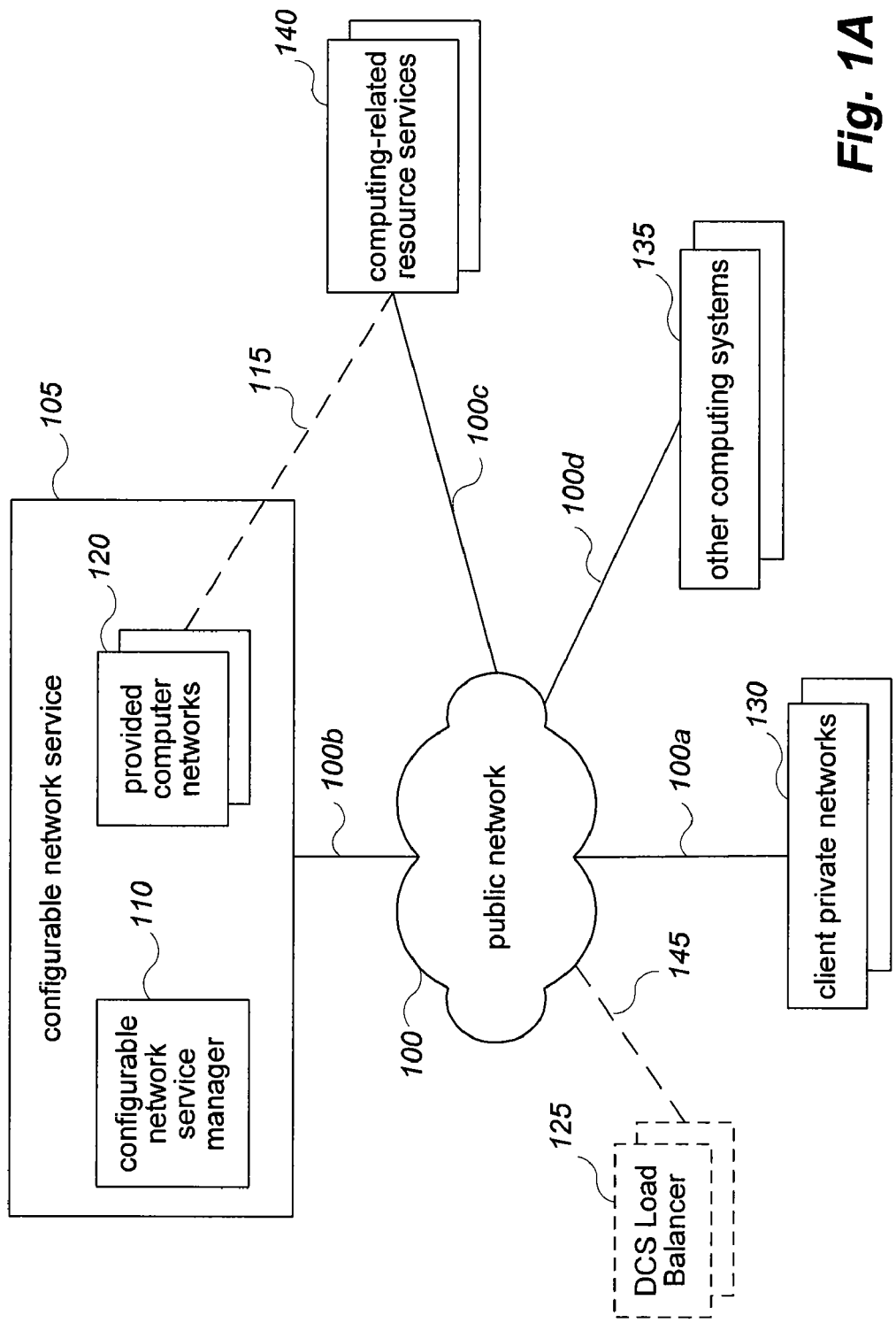
FIGS. 1A and 1B are network diagrams illustrating example embodiments of interactions that involve providing load balancing capabilities so as to dynamically scale computing nodes for which the load balancing is performed.

Techniques are described for providing load balancing capabilities among multiple computing nodes, such as on behalf of a user or other entity. In at least some embodiments, the provided load balancing capabilities include dynamically scaling a group of multiple computing nodes for which the load balancing is performed, such as to dynamically expand and/or shrink the quantity of computing nodes in the group based on predefined criteria, or to otherwise modify computing-related resources used by the computing nodes of the group. In addition, in at least some embodiments, at least some of the computing nodes of a group for a user or other entity are part of one or more physical computer networks in one or more geographical locations and under control of the user or other entity, and at least some of the dynamic scaling of the group uses one or more other computing nodes that are part of a remote computer network (e.g., a virtual computer network provided under the control of a network-accessible service available to remote users). The defined criteria used for the dynamic scaling may be determined in various manners, including by being predefined by a user and/or by being automatically determined, and may be based on various factors (e.g., current and/or predicted load on one or more of the group computing nodes, monetary costs and other costs associated with use of group computing nodes, etc.), as discussed in greater detail below. In addition, in at least some embodiments, some or all of the described techniques are automatically performed by an embodiment of a Dynamic Computing Scaling ("DCS") Load Balancer module, as described in greater detail below.

A DCS Load Balancer module may have various forms and be in various locations in various embodiments. For example, as previously noted, at least some of the computing nodes of a group for an entity may be part of one or more physical networks in one or more geographical locations under control of the entity, and at least some of the dynamic scaling of the group may use one or more other computing nodes that are part of a remote computer network or otherwise provided by a remote network-accessible service. In such situations, one or more DCS Load Balancer modules for the group may be part of the one or more physical networks and/or may be part of the remote computer network, may otherwise be provided by the network-accessible service that provides the remote virtual network on behalf of the entity, or instead may be separate from both the one or more physical networks and the remote computer network in some embodiments. In addition, in some embodiments, a DCS Load Balancer module may be part of a dedicated hardware load balancer device, while in other embodiments a DCS Load Balancer module may be implemented in part or in whole as a software module (e.g., executing on a general-purpose computing system). A DCS Load Balancer module may also be integrated with or otherwise operate on the same physical device as one or more other components in some embodiments, such as a firewall, a network proxy, etc. Additional details related to DCS Load Balancer modules are included below.

In addition, the computing nodes of a group may support various types of software applications and functionality in various embodiments. For example, if at least some of the computing nodes of a group are part of one or more physical networks in one or more geographical locations under control of an entity, the DCS Load Balancer module(s) for the group may handle requests from other computing nodes of the entity (e.g., other computing nodes that are part of the one or more physical networks) and/or from other computing systems of other external users (e.g., if the computing nodes of the group provide network-accessible functionality for use by the other external users). Furthermore, the computing nodes of the group may in some embodiments and situations each execute a copy of a single software application or otherwise provide a single type of functionality (e.g., by acting as a distributed Web server application that provides Web pages or other content as requested), such as to each act as an alternative for providing that single type of functionality—in such embodiments, an associated DCS Load Balancer module may elect to direct received requests for that type of functionality to any of the group computing nodes (e.g., in a random manner, in a round-robin manner, in a weighted manner based on weights associated with each of the group computing nodes, in a manner based on a defined load balancing policy, etc.). In other embodiments and situations, the computing nodes of the group may execute multiple related software applications (e.g., as part of a multi-tiered software architecture, such as using interconnected Web servers, application servers and database servers), such as if each group computing node executes copies of all of the multiple software applications, or instead if different group computing nodes serve different roles (e.g., with one or more computing nodes executing a Web server software application, one or more other computing nodes executing an application server software application, and one or more yet other computing nodes executing a database server software application). Additional details related to computing node applications and functionality are included below.

As previously noted, a DCS Load Balancer module may be configured to dynamically scale the computing nodes of a group when defined criteria are satisfied. Such criteria may include, for example, user-specified and/or automatically learned thresholds, or other types of constraints. In addition, such criteria may be related to one or more of a variety of factors, including operational metrics of the current computing nodes of the group and/or other factors. For example, a non-exclusive list of factors that a DCS Load Balancer module may use in its defined criteria include one or more of the following: degree of availability of each group computing node; volume of requests being received by and/or handled by each group computing node; degree of network utilization for each group computing node; degree of network latency for each group computing node; degree of latency in responding to requests for each group computing node; degree of processor utilization for each group computing node; degree of memory utilization for each group computing node; degree of I/O ("input/output") bandwidth utilization for each group computing node; a number of other group computing nodes (or software applications of those computing nodes) that are currently interacting with or otherwise using each group computing node; a financial cost associated with using one or more group computing nodes for one or more activities at a current time and/or future time; a non-financial cost associated with using one or more group computing nodes for one or more activities at a current time and/or future time (e.g., an environmental cost, which may be represented in financial terms); a user-specified predicted degree of current and/or future demand for one or more other of the factors for each group computing node; an automatically learned or otherwise predicted degree of current and/or future demand for one or more other of the factors for each group computing node; etc. In addition, DCS Load Balancer modules may gather or otherwise obtain current values for and other information about such metrics and other factors in various manners in various embodiments. Additional details related to criteria for determining how and when to perform computing scaling for a group of computing nodes are included below.

In addition, when a DCS Load Balancer module is configured to dynamically scale the computing nodes of a group when defined criteria are satisfied, the DCS Load Balancer module may be further configured to perform the dynamic scaling in various manners. As discussed in greater detail elsewhere, a particular group of computing nodes for a user or other entity may in some embodiments be associated with a particular remote computer network (e.g., a remote virtual network that is associated with the entity and provided by a network-accessible service)—if so, the DCS Load Balancer module may be configured to scale the computing nodes of the group by using resources associated with the remote computer network. The dynamic scaling using the remote computer network may include, for example, dynamically expanding the quantity of computing nodes in the group by using one or more computing nodes of the remote computer network (e.g., if the remote computer network is dynamically expandable, if the remote computer network has one or more existing computing nodes that are available for use as part of the group, etc.), and/or dynamically shrinking the quantity of computing nodes in the group by releasing or otherwise stopping the use of one or more computing nodes of the remote computer network (e.g., if the remote computer network is dynamically shrinkable, if the released computing nodes are left as part of the remote computer network and available for other uses, etc.). In addition, a DCS Load Balancer module may be configured to dynamically scale the group of computing nodes by a particular quantity of computing nodes when particular defined criteria are satisfied, such as to remain at the modified quantity of computing nodes until other defined criteria are satisfied to cause further dynamic scaling, or instead in other manners (e.g., for a particular period of time). Moreover, the configuration of the DCS Load Balancer module may include specified dependencies or other relationships between particular software applications and/or other computing resources, such as to dynamically add a computing node executing a first software application for each two computing nodes that are added executing a second software application (e.g., as part of a multi-tiered architecture); to add a computing node executing a first software application in a geographical location and/or network location that is based at least in part on a location of corresponding stored data, another executing software application, or other computing resources; etc. Furthermore, when dynamically adding one or more computing nodes to the group, the described techniques may further include performing various provisioning of those added computing nodes in at least some embodiments (e.g., by copying one or more particular software applications to the computing node; by configuring one or more particular software applications on the computing node to interact with other group computing nodes and/or to otherwise operate in a desired manner; by performing correctness testing on a new computing node to ensure that it is ready for use, such as by executing an automated testing script on the computing node; etc.).

As previously noted, a DCS Load Balancer module may be configured to dynamically scale the computing nodes of a group by using a remote computer network or other computing nodes provided by a remote network-accessible service. In order to obtain access to such a remote computer network or other remote computing nodes, in at least some embodiments, a user (or the DCS Load Balancer module on behalf of a user) may interact over public networks with a remote network-accessible service that allows the user to configure a computer network that the service provides on behalf of the user, with the configured computer network including multiple computing nodes that are maintained by or otherwise under the control of the network-accessible service. After configuring such a computer network, the user and/or a DCS Load Balancer module may interact from one or more remote locations with the computer network being provided by the network-accessible service, such as to execute programs on the computing nodes of the provided computer network, to dynamically add additional computing nodes to the provided computer network, etc. In at least some embodiments, at least some of the computer networks provided by the network-accessible service may be private computer networks that are each accessible only by the user of the network-accessible service on whose behalf the provided computer network is created and configured (or by others for whom access is explicitly configured). For example, the network-accessible service may provide a user who is a client of the network-accessible service with private access to a computer network provided for the client, such as by enabling a secure VPN ("virtual private network") connection or other private connection between one or more remote computing systems of the client and the provided computer network, or may use other security and/or authentication techniques to enable the client to remotely interact with the provided computer network in a private and/or secure manner. In addition, in at least some embodiments, at least some of the computer networks provided by the network-accessible service are each created and configured by a client to be an extension to an existing computer network of the client, such as a private computer network extension to an existing remote private computer network of the client (e.g., a remote corporate network of a client that is a corporate entity). Furthermore, in at least some embodiments and situations, the computer networks provided by the network-accessible service may be virtual computer networks, while in other embodiments the provided computer networks may be physically connected computer networks. Additional details related to establishing and using a remote computer network provided by a network-accessible service are included below.

The use of the described techniques provides a variety of benefits in a variety of situations. For example, in some embodiments, a user may maintain one or more physical networks with a group of multiple computing nodes to handle a typical amount of network requests, but configure a DCS Load Balancer module for the group to dynamically expand and use one or more computing nodes of a remote virtual network to accommodate temporary spikes in network requests, and to dynamically shrink and release use of some or all of those remote computing nodes when they are no longer needed. Alternatively, in some situations, a user may have one or more physical networks with a group of multiple computing nodes providing a particular type of functionality, and configure a DCS Load Balancer module for the group to gradually migrate that functionality to multiple computing nodes of a remote virtual network (e.g., over a period of hours, over a period of days or weeks, etc.)—such migration may include repeatedly selecting one or more computing nodes of the physical network to be migrated, directing new requests received by the DCS Load Balancer module that would otherwise have been sent to those selected computing nodes to instead be sent to newly added computing nodes of the remote virtual network that provide the same type of functionality, and stopping use of the selected computing nodes after they have finished handling the ongoing sessions or other network interactions that they were involved with before they were selected to be migrated. It will be appreciated that the described techniques may further be used in a variety of other manners.

FIG. 1A is a network diagram illustrating an example of situations in which the described techniques may be used to provide load balancing functionality that dynamically scales a group of computing nodes among which the load balancing occurs. In this example, the dynamic scaling uses remote virtual networks that are provided by an example network-accessible service that provides client-configurable networks, such as remote virtual computer networks that are created and configured as network extensions to existing private computer networks of clients, although in other embodiments the dynamic scaling may be performed in other manners (e.g., by using a network-accessible program execution service that allows programs of users to be executed on provided computing nodes without configuring those provided computing nodes to be part of virtual networks of the users; by using other available computing nodes of a user, such as backup computing nodes available for use in hot swaps; etc.).

In the illustrated example of FIG. 1A, a Configurable Network Service ("CNS") 105 provides functionality to clients (not shown) over one or more public networks 100 (e.g., over the Internet) that enables the clients to access and use virtual computer networks provided to the clients by the CNS 105, so that the remote clients may use the CNS 105 to dynamically modify and extend the capabilities of their remote existing private computer networks to the new provided virtual computer networks using cloud computing techniques over the public network 100. In addition, in the illustrated example, one or more DCS Load Balancer modules 125 further use the functionality provided by the CNS 105 to provide dynamically scalable load balancing functionality, as described in greater detail below. Such dynamically scalable load balancing functionality provided by the DCS Load Balancer modules 125 may be facilitated by the CNS 105 if, for example, the CNS 105 allows provided computer networks to be dynamically modified (e.g., to add or remove computing nodes from provided computer networks), if particular provided computer networks include computing nodes that are available to be temporarily or permanently put into use by a DCS Load Balancer module 125 as needed, etc.

In particular, in FIG. 1A, a number of clients interact over the public network 100 with a Manager module 110 of the CNS 105 to create and configure various private computer network extensions 120 to remote existing client private networks 130, with at least some of the computer network extensions 120 being configured to enable private access from one or more corresponding client private networks 130 over the public network 100 (e.g., via VPN connections established over interconnections 100a and 100b, or via other types of private interconnections). In this example embodiment, the Manager module 110 assists in providing functionality of the CNS 105 to the remote clients, such as in conjunction with various other modules (not shown) of the CNS 105 and various computing nodes and networking devices (not shown) that are used by the CNS 105 to provide the private computer network extensions 120. In at least some embodiments, the CNS Manager module 110 may execute on one or more computing systems (not shown) of the CNS 105, and may provide one or more APIs ("application programming interfaces") that enable remote computing systems to programmatically interact with the module 110 to access some or all functionality of the CNS 105 on behalf of clients (e.g., to create, configure, and/or initiate use of private network extensions 120). In addition, in at least some embodiments, clients may instead manually interact with the module 110 (e.g., via a graphical user interface provided by the module 110) to perform some or all such actions.

Each of the DCS Load Balancer modules 125 may be associated with one or more of the client private networks 130, such as to receive requests related to functionality provided by a group of one or more computing nodes (not shown) of those associated client private networks—such requests may be received, for example, from other computing nodes of those associated client private networks and/or from other computing systems 135 via communications 100d over the public network 100. In addition, in at least some embodiments, a first provided computer network 120 may be configured to enable inter-access with one or more other provided computer networks 120, and if so, a DCS Load Balancer module 125 associated with the first provided computer network 120 may similarly receive and handle requests from computing nodes of those other provided computer networks 120. As previously noted, one or more of the client private networks 130 may each have an associated provided computer network 120 from the CNS 105, such as a private network extension of the client private network. In such situations, when a DCS Load Balancer module 125 receives a request for functionality provided by the associated group of computing node(s), the DCS Load Balancer module 125 may forward the request to an appropriate one of the group on the associated client private network 130 to provide the functionality corresponding to the request. In addition, if the DCS Load Balancer module 125 determines that defined criteria are satisfied, the DCS Load Balancer module 125 may further perform interactions with the Configurable Network Service 105 as part of dynamically scaling the group of computing nodes of the associated client private network 130, such as one or more of the following: to initiate creation of a provided computer network 120 to be used as part of the group of computing nodes for the client private network 130; to initiate the addition of one or more computing nodes to an existing provided computer network 120 for the client private network 130, to be used as part of the group of computing nodes; to initiate the use of one or more existing computing nodes of the existing provided computer network 120 as part of the group of computing nodes for the client private network 130; to forward one or more received requests to one or more computing nodes of the provided computer network 120 that are part of the group of computing nodes for the client private network 130, to be handled by those computing nodes of the provided computer network 120; etc.

While the DCS Load Balancer modules 125 are illustrated in this example as optionally being accessible via the public network 100 via a connection 145, some or all of the DCS Load Balancer modules 125 may each be located as part of a particular associated client private network 130 and/or as part of a particular provided computer network 120. For example, a DCS Load Balancer module 125 that is part of a particular client private network 130 may be provided by and configured by an entity that provides that client private network, while a DCS Load Balancer module 125 that is part of a particular provided computer network 120 may be provided by and configured by the CNS 105 (e.g., via one or more load balancer modules hosted by the CNS 105, whether in software and/or hardware). In other embodiments, the CNS 105 may provide functionality to implement a DCS Load Balancer module 125 for a particular client private network 130 with an associated provided computer network 120, but without the implemented DCS Load Balancer module 125 being part of the associated provided computer network 120 (e.g., if a single DCS Load Balancer module 125 of the CNS 105 is used to support multiple provided computer networks 120).

In the example of FIG. 1A, the public network 100 may be, for example, a publicly accessible network of linked networks, possibly operated by distinct parties, such as the Internet. The remote client private networks 130 may each include one or more existing private networks, such as a corporate or other private network (e.g., home, university, etc.) that is partially or wholly inaccessible to non-privileged users, and that includes computing systems and/or other networked devices of a client. In the illustrated example, the provided network extensions 120 each include multiple computing nodes (not shown), at least some of which are provided by or otherwise under the control of the CNS 105, and each of the provided network extensions 120 may be configured in various ways by the clients for whom they are provided. Each of the network extensions 120 in the illustrated embodiment may be a private computer network that is accessible only by the client that creates it, although in other embodiments at least some computer networks provided by the CNS 105 for clients may be publicly accessible and/or may be standalone computer networks that are not extensions to other existing computer networks. Similarly, while the provided computer networks 120 in the example are extensions to remote client computer networks 130 that are private networks, in other embodiments the provided computer networks 120 may be extensions to client computer networks 130 that are not private networks.

Private access between a remote client private computer network 130 and corresponding private computer network extension 120 provided for a client may be enabled in various ways, such as by establishing a VPN connection or other private connection between them that allows intercommunication over the public network 100 in a private manner. For example, the CNS 105 may automatically perform appropriate configuration on its computing nodes and other computing systems to enable VPN access to a particular private network extension 120 of a client, such as by automatically configuring one or more VPN mechanisms hosted by the CNS 105 (e.g., software and/or hardware VPN mechanisms), and/or may automatically provide appropriate configuration information to the client (e.g., credentials, access points, and/or other parameters) to allow a VPN mechanism hosted on the remote client private network 130 to establish the VPN access. After VPN access has been appropriately enabled and/or configured, a VPN connection may be established between the remote client private network and the private network extension, such as initiated by the client using IPsec ("Internet Protocol Security") or other appropriate communication technologies. For example, in some embodiments, a VPN connection or other private connection may be established to or between networks that use MPLS ("Multi Protocol Label Switching") for data transmission, such as instead of an IPsec-based VPN connection.

In addition, in the illustrated embodiment, various network-accessible remote resource services 140 are available to remote computing systems over the public network 100, including to computing nodes on the remote client private networks 130. The resource services 140 may provide various functionality to the remote computing nodes, such as for at least some of the resource services 140 to provide remote computing nodes with access to various types of computing-related resources. Furthermore, at least some of the private network extensions 120 that are provided by the CNS 105 may be configured to provide access to at least some of the remote resource services 140, with that provided access optionally appearing to computing nodes of the private network extensions 120 as being locally provided via virtual connections 115 that are part of the private network extensions 120, although the actual communications with the remote resource services 140 may occur over the public networks 100 (e.g., via interconnections 100b and 100c). In addition, in at least some embodiments, a DCS Load Balancer module 125 may be configured to dynamically scale capabilities of a group of computing nodes of one of the client private networks 130 by further performing with one or more of the resource services 140, such as to dynamically scale one or more types of computing-related resources available to one or more of the computing nodes of the group (e.g., to dynamically shrink and/or expand an amount of the one or more types of computing-related resources).

The provided network extensions 120 may each be configured by clients in various manners. For example, in at least some embodiments, the CNS 105 provides multiple computing nodes that are available for use with network extensions provided to clients, such that each provided network extension 120 may include a client-configured quantity of multiple such computing nodes that are dedicated for use as part of the provided network extension. In particular, a client may interact with the module 110 to configure a quantity of computing nodes to initially be included in a computer network provided for the client (e.g., via one or more programmatic interactions with an API provided by the CNS 105). In addition, in at least some such embodiments, computing nodes may later be dynamically added to or removed from a provided computer network of a client (e.g., via one or more programmatic interactions with an API provided by the CNS 105), such as after the provided computer network has already been in use by the client (e.g., by indicating to initiate or terminate execution of particular programs on particular computing nodes). Furthermore, the CNS 105 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client. In addition, in at least some embodiments, a client may interact with the module 110 to configure network addresses for a computer network provided for the client (e.g., via one or more programmatic interactions with an API provided by the CNS 105), and network addresses may later be dynamically added, removed or modified for a provided computer network of a client in at least some such embodiments, such as after the provided computer network has already been in use by the client. In addition, in at least some embodiments, a client may interact with the module 110 to configure network topology information for a computer network provided for the client (e.g., via one or more programmatic interactions with an API provided by the CNS 105), and such network topology information may later be dynamically modified for a provided computer network in at least some such embodiments, such as after the provided computer network has already been in use by the client. Furthermore, in at least some embodiments, a client may interact with the module 110 to configure various network access constraint information for a computer network provided for the client (e.g., via one or more programmatic interactions with an API provided by the CNS 105), and such network access constraint information may later be dynamically modified for a provided computer network in at least some such embodiments, such as after the provided computer network has already been in use by the client. In at least some embodiments, a DCS Load Balancer module 125 may similarly be configured to interact with the module 110 to perform some or all such configurations of provided computer networks 120 on behalf of particular clients, such as to facilitate the dynamic scaling for the client private networks 130 of those clients.

Network addresses may be configured for a provided computer network in various manners in various embodiments. For example, if a particular provided computer network that is being configured is an extension to an existing remote client computer network, the client may specify one or more address ranges (e.g., a Classless Inter-Domain Routing ("CIDR") address block) or other groups of network addresses that are a subset of the network addresses used by the existing remote client computer network, such that the specified network addresses are used for the computing nodes of the provided computer network. Such configured network addresses may in some situations be virtual or private network addresses that are not directly addressable from computing systems on the public network 100 (e.g., if the existing remote client computer network and the corresponding provided network extension use network address translation techniques and/or virtual networking techniques for the client computer network and its provided network extension), while in other situations at least some of the configured network addresses may be public network addresses that are directly addressable from computing systems on the public network 100 (e.g., a public network address that is a static Internet-routable IP address or other non-changing network address). In other embodiments, the CNS 105 may automatically select network addresses to be used for at least some computing nodes of at least some provided computer network extensions, such as based on network addresses that are available for use by the CNS 105, based on selecting network addresses that are related network addresses used by remote existing computer networks corresponding to the provided computer networks, etc. Furthermore, if two or more of the computer networks provided by the CNS 105 are configured to enable inter-communications between the provided computer networks (e.g., for two or more computer networks provided to a single customer, such as for different departments or groups within a single organization; for two or more computer networks provided to two or more distinct customers; etc.), the CNS 105 may in some embodiments automatically select network addresses to be used for at least some computing nodes of those provided computer networks to facilitate the inter-communications, such as by using different network addresses for the various provided computer networks. In addition, in at least some embodiments in which the CNS 105 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CNS 105 manages the network addresses distinctly for each client, such that a first client may have a first computing node associated with a particular specified network address for the first client's provided computer network, while a distinct second client may have a distinct second computing node associated with the same particular specified network address for the second client's provided computer network. Once network addresses are configured or otherwise determined for a provided computer network, the CNS 105 may assign the network addresses to various of the computing nodes selected for the provided computer network, such as in a random manner, by using DHCP ("Dynamic Host Configuration Protocol") or other techniques for dynamic assignment of network addresses, etc.

Network topology information may be configured for a provided computer network in various manners in various embodiments. For example, a client may specify particular types of networking devices (e.g., routers, switches, etc.) and/or other network devices or nodes (e.g., load balancers, firewalls, proxies, network storage devices, printers, etc.) to be part of the provided computer network, and/or may specify subsets of the computing nodes of the provided computer network to be grouped together or that are to otherwise share common intercommunication characteristics (e.g., a particular subset of computing nodes that are part of a subnet for which intercommunications are not filtered and/or that are associated with a particular networking device, a particular subset of computing nodes that are part of a group that is managed by a DCS Load Balancer module, etc.). In addition, the specified configuration information for a provided computer network may in at least some embodiments include routing information or other interconnectivity information between networking devices and/or groups of computing devices. Furthermore, in at least some embodiments, the CNS 105 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS 105 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; constraints or other preferences based on the cost of obtaining use of particular computing nodes and/or for particular types of interactions with particular computing nodes, such as costs associated with providing data to and/or from those computing nodes; etc.).

As discussed in greater detail elsewhere, in at least some embodiments, the interconnections and intercommunications between computing nodes of a provided computer network are managed using an underlying substrate network of the CNS 105, and if so, some or all of the configured network topology information may be simulated in at least some such embodiments using the underlying substrate network and corresponding modules of the CNS 105. For example, each of the computing nodes provided by the CNS 105 may be associated with a node communication manager module of the CNS 105 that manages communications to and from its associated computing nodes. If so, firewall devices may be simulated by using the associated communication manager module for a computing node to disallow or otherwise handle communications to and/or from the computing node in a manner consistent with one or more simulated firewall devices. Such node communication manager modules may similarly simulate routers and subnets by controlling how and whether intercommunications are passed between computing nodes, and by responding to requests from computing nodes for information (e.g., ARP, or address resolution protocol, requests) with appropriate response information. One or more external communication manager modules of the CNS 105 may manage communications between the computing nodes provided by the CNS 105 and external computing systems, such as to similarly simulate firewall devices and enforce specified network access constraints, as well as to manage configured access mechanisms for remote resource services and private connections to remote client private computer networks. Other types of network topology information may be similarly simulated.

Network access constraint information may be configured for a provided computer network in various manners in various embodiments. For example, a client may specify information about whether and how some or all of the computing nodes of a provided computer network are allowed to communicate with other computing nodes of the provided computer network and/or with other external computing systems, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which access has been established, external to the provided computer network and any corresponding remote client computer network, etc.); types of other computing systems; etc. In a manner similar to that for network topology information and other routing information, the CNS 105 may enforce network access constraint information for provided computer networks in various manners.

For illustrative purposes, some embodiments are described below in which specific types of computing nodes, networks, communications, and configuration operations are performed. These examples are provided for illustrative purposes and are simplified for the sake of brevity, and the inventive techniques may be used in a wide variety of other situations, some of which are discussed below. For example, in some embodiments, the computer networks that are created and configured for access by clients are private computer network extensions to existing private computer networks of those clients, while in other embodiments the created and configured computer networks may be standalone computer networks that are not extensions to other computer networks and/or may be public computer networks that are not privately accessible by the client on whose behalf they are created and configured. Furthermore, in some embodiments, particular computer networks provided by a configurable network service may be configured to enable private access to or other inter-communications with other computer networks provided by the configurable network service, while in other embodiments such inter-communications between multiple provided computer networks may not be provided. In addition, in some embodiments the computer networks provided by the configurable network service use computing nodes that are provided by and controlled by a configurable network service, while in other embodiments at least some such computing nodes that are used for provided computer networks may be controlled or maintained by others (e.g., by third-parties, by the clients, etc.) but made available for use with the configurable network service. For example, in some embodiments, a DCS Load Balancer module may access and use computing nodes provided by and controlled by multiple distinct configurable network services whose computing nodes are in one or more geographical locations distinct from a location of the DCS Load Balancer module and/or of one or more computing nodes of a group managed by the DCS Load Balancer module (e.g., based on the DCS Load Balancer module directly interacting with multiple distinct configurable network services, based on a particular configurable network service from a first entity providing functionality to the DCS Load Manager module by interacting with another configurable network service from a second entity to obtain access to functionality from that second configurable network service on behalf of the DCS Load Manager module, etc.), such as to provide a specified degree of geographical distribution of the computing nodes of the group.

Figure 1B:
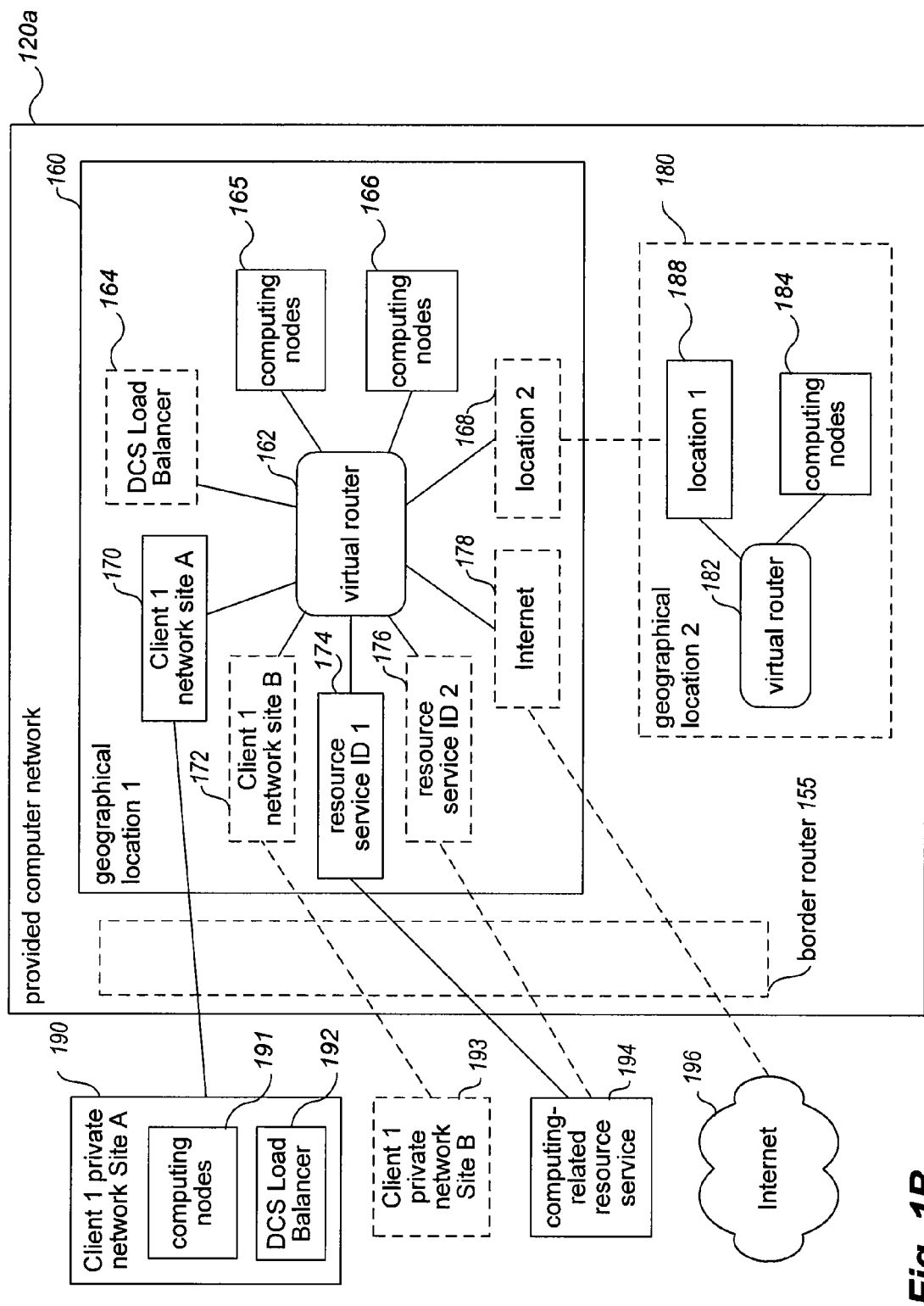
Figure 2:
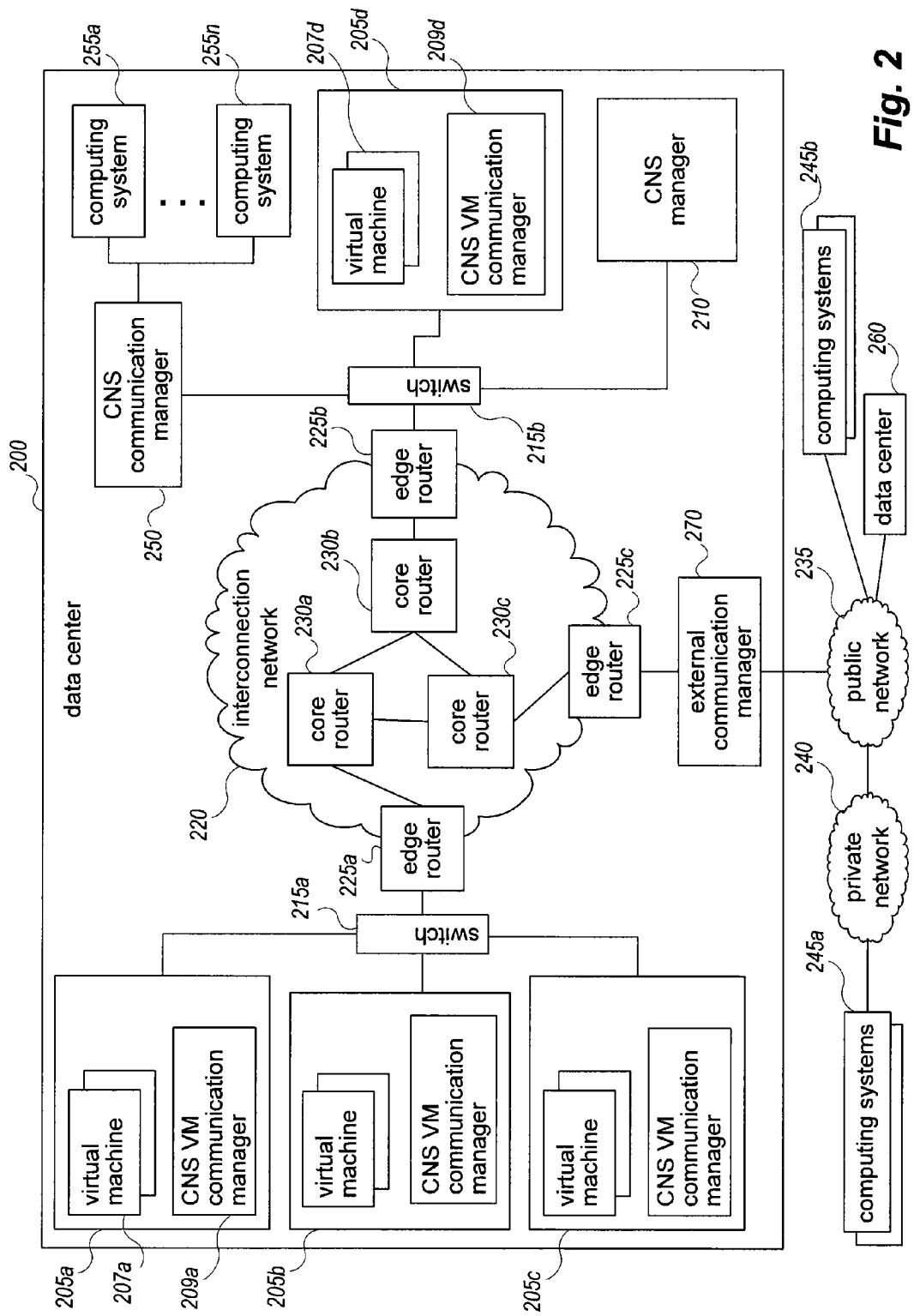
FIG. 2 is a network diagram illustrating an example embodiment of interconnected computing systems for use in providing dynamically scalable load balancing capabilities.

FIG. 1B illustrates additional details regarding an example computer network 120a that may be provided by the CNS 105 (or other embodiment of a network-accessible service) for a client, with the provided computer network 120a in this example being a private network extension to a remote private computer network of the client, such as one of the remote private computer networks 130 of FIG. 1A. In this example, various connections and communication paths for the provided computer network 120a are shown in a conceptual manner to illustrate types of configurable network access constraints and network topology, and FIG. 2 illustrates additional details regarding an example of underlying substrate networks and connections that may be used to create provided computer networks such as the example provided computer network 120a. In addition, in this example, a DCS Load Manager module 192 associated with the provided computer network 120a is illustrated as being part of a remote client private network at a location 190, although in other embodiments the provided computer network 120a may optionally include a DCS Load Manager module 164 as part of the provided computer network 120a.

In particular, in FIG. 1B, the provided computer network 120a includes various computing nodes provided by the CNS 105 that are located at a first geographical location 1 160 (e.g., at a first data center at the geographical location 1), with the various computing nodes being configured into logical groups 165 and 166 in this example (e.g., to correspond to different subnets and/or associated configured networking devices, not shown). In this example, a single conceptual virtual router 162 is shown at geographical location 1 to control communications between those computing nodes and other computing systems, so as to illustrate different types of communications that may occur, although the provided computer network 120a may actually have multiple or no configured networking devices at geographical location 1, and the computer network 120a may be implemented by the configurable network service at the geographical location 1 in various manners, such as via multiple physical interconnected routers or other networking devices, by using an underlying substrate network and associated modules that control communications over the underlying substrate network, etc. In this example, the virtual router 162 operates in accordance with the configured information for the provided computer network 120a, including configured network topology information, configured access to remote resource services, and other configured network access constraint information, such as to route communications that are sent to network addresses within the provided computer network 120a to corresponding destination computing nodes on the provided computer network 120a, and to route other communications to other network addresses outside of the provided computer network 120a as appropriate. Furthermore, communications that are not permitted by configured firewall devices, configured network topology information, or other configured network access constraints may be blocked or otherwise managed by the virtual router 162.

In this example, the computer network 120a is provided for an example Client 1, and is a network extension to a remote computer network of Client 1. Client 1's remote computer network includes multiple computing nodes 191 at a first remote location Site A 190, and the virtual router 162 is configured to communicate with those multiple computing nodes via a virtual communication link 170 at the geographical location 1. For example, as discussed in greater detail elsewhere, the provided computer network 120a may include one or more configured VPN connections to the multiple computing systems at Site A 190, and the communication link 170 may correspond to one or more such VPN connections. In addition, when the DCS Load Balancer module 192 is managing a group of multiple computing nodes for the client, and that group includes one or more of the computing nodes 165 and/or 166 (e.g., after the DCS Load Balancer module has dynamically scaled the group to include those one or more computing nodes 165 and/or 166, or instead if the group is initially configured to include those one or more computing nodes 165 and/or 166), the DCS Load Balancer module 192 may route at least some received requests for the group of computing nodes to one or more of those computing nodes 165 and/or 166 at the provided computer network 120a via the virtual communication link 170.

In addition, the remote computer network of Client 1 may optionally include computing nodes at one or more other locations, such as the illustrated optional Site B 193, and if so the computing nodes at Site A 190 and at Site B 193 may be interconnected via one or more communication links (not shown), such as via the Internet 196 and/or one or more private connections—in such situations, if the group of multiple computing nodes being managed by the DCS Load Balancer module 192 includes one or more of the computing nodes (not shown) at Site B 193, the DCS Load Balancer module 192 may route at least some received requests for the group of computing nodes to one or more of those computing nodes at Sited B 193 via those one or more communication links. In addition, if the remote client computer network of Client 1 includes computing nodes at Site B 193, the virtual router 162 may further be configured to communicate with those other computing nodes at the other locations, such as via an optional virtual communication link 172 to Site B 193 (e.g., via one or more other configured VPN connections directly to Site B). When multiple VPN connections or other private connections are used to remote computing systems of a remote computer network, each connection may correspond to a subset of the remote computing systems (e.g., by being associated with a subset of the network addresses of the remote computer network that correspond to those remote computing systems), so as to cause communications to be routed to the appropriate connection. In other embodiments, multiple VPN connections or other private connections may be used to remote computing systems at one or more locations, but may each support communications to any of the remote computing systems, such as if the multiple connections are redundant alternatives (e.g., used for load balancing). Furthermore, in some embodiments, a client's remote computer network may include multiple computing systems at multiple sites, but only a single VPN connection or other private connection to the remote computing systems may be used, with the remote computer network being responsible for routing the communications to the appropriate site and computing system.

In addition, the provided computer network 120a may be configured to allow all, some or no communications between the computing nodes of the provided computer network 120a and other external computing systems that are generally accessible on the Internet 196 or other public networks. If at least some such external communications are allowed, the virtual router 162 may further be configured to communicate with those external multiple computing systems via an optional virtual communication link 178 of the provided computer network 120a, such as in conjunction with an optional virtual border router 155 for the provided computer network 120a. The virtual border router 155 may be physically implemented in various manners, such as by the CNS 105 using one or more actual firewall devices or border router devices that manage communications between external computing systems and the various computing nodes provided by the CNS 105 at geographical location 1 (e.g., actual devices that support numerous computer networks provided by the CNS 105 to clients that use those computing nodes of the CNS 105), by using an underlying substrate network and associated modules that control communications over the underlying substrate network (e.g., to prevent disallowed communications from being sent by computing nodes of the provided computer network 120*a* onto the substrate network), etc. Furthermore, the virtual border router 155 may further conceptually assist in managing other communications to other computing systems external to the provided computer network 120*a*, such as to the remote client computer network at Sites A and B, to one or more remote resource services, etc.

In addition, the provided computer network 120*a* may be configured to provide private or other specialized access to one or more remote resource services, such as by assigning one or more network addresses of the provided computer network 120*a* to represent those one or more remote resource services, and by optionally configuring particular actions to be taken for communications sent to those assigned network addresses. In this example, the virtual router 162 has been configured to provide local access to remote resource service 194 via a virtual communication link 174 of the provided computer network 120*a*. Thus, for example, if one of the computing nodes of the provided computer network 120*a* sends a communication to a particular network address of the provided computer network 120*a* that is mapped to the communication link 174, the virtual router may forward that communication to the remote resource service 194 external to the provided computer network 120*a* (e.g., via the Internet or other public networks). In other embodiments, the remote resource service 194 may implement an interface that is part of the CNS 105 or otherwise at the geographical location 1, and if so the communications sent to the particular network address of the provided computer network 120*a* that is mapped to the communication link 174 may instead be forwarded to that interface of the remote resource service for handling. In addition, the virtual communication link 174 may be configured in at least some embodiments to manage communications sent via the link in various manners, such as to modify those communications in one or more manners before they are forwarded to the remote resource service 194, or to otherwise access the remote resource service 194 in a specialized manner. For example, in the illustrated embodiment, the virtual communication link 174 may be configured to correspond to a particular namespace within the remote resource service 194, with a subset of the computing-related resources provided by the remote resource service 194 being part of that namespace, or may instead be configured to correspond to one or more particular identifiers or other access control indicators that are associated with the provided computer network 120*a* by the configurable network service or by the remote resource service 194. In addition, if the virtual communication link 174 is configured to correspond to a particular namespace or to otherwise correspond to a subset of the resources provided by the remote resource service 194, the provided computer network 120*a* may optionally be further configured to include one or more other virtual communication links that also correspond to the same remote resource service 194 but are configured to access the remote resource service 194 in other manners, such as if the provided computer network 120*a* optionally includes a distinct virtual communication link 176 that is configured to access the remote resource service 194 in a distinct manner than that of virtual communication link 174 (e.g., to correspond to a distinct second namespace, to not correspond to any particular namespace, to use an identifier of a customer of the remote resource service 194 that is distinct from a customer identifier used for communication link 174, etc.).

In the illustrated embodiment, in addition to the computing nodes of the CNS 105 at geographical location 1, the provided computer network 120 may further include computing nodes 184 provided by the CNS 105 that are located at a second geographical location 2 180 (e.g., at a distinct second data center at the geographical location 2). Accordingly, the virtual router 162 may be configured to include an optional virtual communication link 168 to the portion of the provided computer network 120*a* at the geographical location 2. In this example, the portion of the provided computer network 120*a* at the geographical location 2 similarly is illustrated with a conceptual virtual router 182 to manage communications to and from the computing nodes 184, including to communicate with the portion of the provided computer network 120 at the geographical location 1 via a virtual communication link 188. Such communications between computing nodes of the CNS 105 at different geographical locations may be handled in various manners in various embodiments, such as by sending the communications over the Internet or other public networks (e.g., as part of a secure tunnel, such as that uses encryption supported by the CNS 105), by sending the communications in a private secure manner (e.g., via a dedicated lease line between the geographical locations) or other private manner, etc. In addition, while not illustrated here, the portion of the provided computer network 120*a* at the geographical location 2 may similarly include some or all of the same types of other virtual communication links illustrated for the portion at geographical location 1, such as to a remote client private network (e.g., via one or more VPN connections distinct from any VPN connections to the geographical location 1), to remote resource services, to the Internet, etc.

In such situations in which a provided computer network 120*a* includes computing nodes at multiple geographical locations or otherwise includes computing nodes that differ with respect to one or more attributes, when the DCS Load Balancer module dynamically scales a group of computing nodes by modifying computing nodes of the provided computer network 120*a* that are part of the group (e.g., by expanding and/or shrinking computing nodes of the provided computer network 120*a* that are used for the group), the DCS Load Balancer module may further be configured in some embodiments to provide information related to particular computing nodes or types of computing nodes at the provided computer network 120*a* that are to be modified (e.g., based on attributes of those computing nodes, based on distance to or other relationships of those computing nodes with other indicated computing-related resources, etc.), as discussed in greater detail elsewhere.

It will be appreciated that the example provided computer network 120*a* of FIG. 1B is included for exemplary purposes, and that other computer networks provided by the CNS 105 for clients may not include all of the types of configured communications links and network topology information, and/or may include other types of configured communications links and network topology information that is not illustrated here. For example, in some embodiments and situations, a provided computer network may include configured devices and other resources in addition to or instead of computing nodes, and if so, each such other resource may optionally be assigned a network address of the provided computer network. Furthermore, the conceptual devices and communication links illustrated in FIG. 1B may be implemented using a variety of types of underlying physical devices, connections and modules. In addition, while not illustrated here, clients may perform a variety of other types of interactions with remote resource services, whether from provided computer networks or instead other remote computing systems, such as to subscribe/register to use resources, receive/create various credentials (e.g., user IDs, passwords, etc.), create resources and/or namespaces from other remote computing systems (e.g., that are part of a remote private corporate network) that are later accessed from a provided computer network (e.g., a network extension to the private corporate network), etc.

FIG. 2 is a network diagram illustrating an example embodiment of computing systems for use in providing computer networks, such as by an embodiment of a configurable network service. In particular, in this example, a number of physical computing systems are co-located in a data center 200 and are interconnected via various networking devices and one or more physical networks. The physical computing systems and other devices are used in this example by a configurable network service to provide multiple computer networks for clients, by establishing and maintaining each of the provided computer networks as a virtual network, and by using the physical network(s) as a substrate network on which the virtual networks are overlaid. For example, with respect to the example of FIG. 1B, the data center 200 may be located at geographical location 1, and the illustrated physical computing systems may be used to provide the computing nodes 165 and 166 of provided computer network 120a. The use of the overlay networks and underlying substrate network may be transparent to the computing nodes of the provided computer networks in at least some embodiments.

In addition, one or more DCS Load Balancer modules may be located in various locations, and may use the provided computer networks as part of providing load balancing functionality by dynamically scaling a group of multiple computing nodes for which the load balancing is performed. For example, one or more such DCS Load Balancer modules may each be part of a private network 240 and communicate with a corresponding provided computer network at the data center 200 via the public network 235, or may instead be associated with one or more other computing systems 245b or other computing systems at a data center 260 that are directly connected to the public network 235. While not illustrated here, in some embodiments, the computing systems at the data center 200 may further include one or more such DCS Load Balancer modules, which may interact with the manager module 210 over the internal network 220 in order to perform dynamic scaling of one or more groups of computing nodes.

In this example, the computer networks provided by the configurable network service are implemented as virtual overlay networks that send communications via an underlying physical substrate network. The provided virtual overlay networks may be implemented in various ways in various embodiments, such as without encapsulating communications in some embodiments (e.g., by embedding virtual network address information for a virtual network in communications configured for a networking protocol of the physical substrate network). As one illustrative example, a virtual network may be implemented using 32-bit IPv4 ("Internet Protocol version 4") network addresses, and those 32-bit virtual network addresses may be embedded as part of 128-bit IPv6 ("Internet Protocol version 6") network addresses used by the physical substrate network, such as by re-headering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual network and substrate network may be implemented using the same network addressing protocol (e.g., IPv4 or IPv6), and data transmissions sent via the provided virtual overlay network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay networks may be implemented using encapsulation of communications.

The illustrated example of FIG. 2 includes a data center 200 with multiple physical computing systems operated by an embodiment of the configurable network service. The data center 200 is connected to one or more public networks 235 external to the data center 200, which provide access to one or more remote computing systems 245a via private network 240, to one or more other globally accessible data centers 260 that each have multiple computing systems at other geographical locations, and to one or more other remote computing systems 245b. The public network 235 may be, for example, a publicly accessible network of networks, possibly operated by various distinct parties, such as the Internet, and the private network 240 may be, for example, a corporate network that is wholly or partially inaccessible from computing systems external to the private network 240. Computing systems 245b may each be, for example, a home computing system that connects directly to the Internet (e.g., via a telephone line, cable modem, a Digital Subscriber Line ("DSL"), etc.)

In this example, the configuring of the virtual provided computer networks is facilitated by a manager module 210 of the configurable network service, and multiple other modules of the configurable network service are used to implement functionality of the provided computer networks, such as from the edge of the physical substrate network by modifying communications that enter and/or leave the substrate network. In particular, in this example, multiple node communication manager modules of the configurable network service each manage communications to and from associated computing nodes, such as the illustrated node communication manager modules 209a, 209d and 250 as discussed in greater detail below. In addition, in this example, an external communication manager module 270 of the configurable network service manages communications between the physical computing systems within the data center 200 and external computing systems, as discussed in greater detail below. While only a single external communication manager module 270 is illustrated in this example, it will be appreciated that the functionality of the module 270 may be implemented using multiple devices.

The data center 200 includes a number of physical computing systems 205a-205d and 255a-255n, as well as a CNS node communication manager module 250 that executes on one or more other computing systems (not shown) to manage communications for the associated computing systems 255a-255n, and a manager module 210 of the configurable network service that executes on one or more computing systems (not shown). In this example embodiment, each physical computing system 205a-205d hosts multiple virtual machine computing nodes and also includes a virtual machine ("VM") node communication manager module (e.g., as part of a virtual machine hypervisor monitor for the physical computing system), such as the CNS VM node communication manager module 209a and virtual machines 207a on computing system 205a, and such as CNS VM node communication manager module 209d and virtual machines 207d on computing system 205d. Each of the virtual machine computing nodes may be used by the configurable network service as a distinct computing node of a computer network provided for a client. Physical computing systems 255a-255n do not execute any virtual machines in this example, and thus may each act as a distinct computing node that is part of a computer network provided for a client by the configurable network service. In other embodiments, all or none of the physical computing systems at the data center may host virtual machines.

This example data center further includes multiple physical networking devices, such as switches 215a and 215b, edge routers 225a-225c, and core routers 230a-230c. Switch 215a is part of a physical network that includes physical computing systems 205a-205c, and is connected to edge router 225a. Switch 215b is part of a distinct physical network that includes physical computing systems 205d, 255a-255n, and the computing system(s) providing the CNS node communication manager module 250 and the CNS system manager module 210, and is connected to edge router 225b. The physical networks established by switches 215a-215b, in turn, are connected to each other and other networks (e.g., the public network 235) via an intermediate interconnection network 220, which includes the edge routers 225a-225c and the core routers 230a-230c. The edge routers 225a-225c provide gateways between two or more networks. For example, edge router 225a provides a gateway between the physical network established by switch 215a and the interconnection network 220. Edge router 225c provides a gateway between the interconnection network 220 and public network 235. The core routers 230a-230c manage communications within the interconnection network 220, such as by forwarding packets or other data transmissions as appropriate based on characteristics of such data transmissions (e.g., header information including source and/or destination substrate network addresses, protocol identifiers, etc.) and/or the characteristics of the interconnection network 220 itself (e.g., routes based on physical network topology, etc.).

The illustrated node communication manager modules manage communications sent to and from associated computing nodes. For example, node communication manager module 209a manages associated virtual machine computing nodes 207a, node communication manager module 209d manages associated virtual machine computing nodes 207d, and each of the other node communication manager modules may similarly manage communications for a group of one or more other associated computing nodes. The illustrated node communication manager modules may manage communications between computing nodes so as to overlay a particular virtual network over the intermediate physical substrate network (e.g., the interconnection network 220 and the physical networks associated with switches 215a and 215b), and may implement firewall policies and other network access constraints to control such communications. The external communication manager module 270 manages external communications that enter and leave the data center 200, such as to further implement the overlay networks over the substrate network within the data center 200 with regard to such external communications. The external communication manager module 270 may take actions to implement firewall policies and other network access constraints, including at least some configured access mechanisms for provided computer networks that allow private or other specialized access to remote resource services external to the data center 200, and optionally at least some VPN connections to external remote client computer networks, or may instead operate in conjunction with other hardware and/or software (not shown) that implements the configurable network service's portion of such VPN connections.

Thus, as one illustrative example, one of the virtual machine computing nodes 207a on computing system 205a may be part of a particular provided virtual computer network (e.g., provided computer network 120a of FIG. 1B) for a client, along with one of the virtual machine computing nodes 207d on computing system 205d and with the computing system 255a (and optionally other computing nodes in this data center or in one or more other data centers 260 that are also used by the configurable network service), and with IPv4 being used to represent the virtual network addresses for the virtual network. Other of the virtual machine computing nodes 207a, virtual machine computing nodes 207d, and computing systems 255b-255n (as well as other of the illustrated computing nodes) may be currently dedicated to other computer networks being provided to other clients, may be currently unassigned to a provided computer network and available for use by the configurable network service, and/or may also be part of the same particular provided virtual computer network. A program executing for the client on the virtual machine computing node 207a that is part of the particular provided virtual computer network may then direct an outgoing communication (not shown) to the virtual machine computing node 207d of the particular provided virtual computer network, such as by specifying a virtual network address for that provided virtual computer network that is assigned to that destination virtual machine computing node 207d. The node communication manager module 209a receives the outgoing communication, and in at least some embodiments determines whether to authorize the sending of the outgoing communication, such as based on previously configured information about the sending virtual machine computing node 207a and/or about the destination virtual machine computing node 207d, and/or by dynamically interacting with the system manager module 210 (e.g., to obtain an authorization determination, to obtain some or all such information, etc.).

If the node communication manager module 209a determines that the outgoing communication is authorized (or does not perform such an authorization determination), the module 209a determines the actual physical substrate network location corresponding to the destination virtual network address for the communication. In this example, the interconnection network uses IPv6 to represent the actual network addresses for computing nodes connected via the interconnection network, and the module 209a re-headers the outgoing communication so that it is directed to node communication manager module 209d using an actual IPv6 substrate network address. The node communication manager module 209a may determine the actual IPv6 destination network address to use for the virtual network address of the destination virtual computing node 207d by, for example, dynamically interacting with the system manager module 210, or may have previously determined and stored that information (e.g., in response to a prior request from the sending virtual machine computing node 207a for information about that destination virtual network address, such as a request using Address Resolution Protocol, or ARP). In this example, the actual IPv6 destination network address that is used embeds the virtual destination network address and additional information, so as to send the communication over the overlay network without encapsulation.

When the node communication manager module 209d receives the communication via the interconnection network 220, it extracts the virtual destination network address and additional information from the actual IPv6 destination network address, and determines to which of the virtual machine computing nodes 207d that the communication is directed. The node communication manager module 209d next optionally determines whether the communication is authorized for the destination virtual machine computing node 207d, such as by extracting the virtual source network address and additional information from the actual IPv6 source network address, and confirming that the computing node with that virtual source network address is actually managed by the node communication manager module that forwarded the communication (in this example, node communication manager module 209a), so as to prevent spoofing of source network addresses by malicious senders. If the communication is determined to be authorized (or the node communication manager module 209d does not perform such an authorization determination), the module 209d then re-headers the incoming communication so that it is directed to the destination virtual machine computing node 207d using an appropriate IPv4 network address for the virtual network, such as by using the sending virtual machine computing node's virtual network address as the source network address and by using the destination virtual machine computing node's virtual network address as the destination network address. After re-headering the incoming communication, the module 209d then forwards the modified communication to the destination virtual machine computing node. In at least some embodiments, before forwarding the incoming communication to the destination virtual machine, the module 209d may also perform additional steps related to security. For example, the module 209d may verify that the sending virtual machine computing node is authorized to communicate with the destination virtual machine (e.g., based on belonging to the same virtual network and/or on network access constraint information specified for that provided virtual network, being associated with the same customer or other entity, being associated with different entities whose computing nodes are authorized to intercommunicate, etc.) and/or that the incoming communication is of an allowed type, such as based on information previously obtained by the module 209d or based on interacting with the system manager module 210.

If the sending virtual machine computing node 207a instead (or in addition) directs an outgoing communication (not shown) to one or more intended destination computing systems external to the data center 200, the node communication manager module 209a receives and handles the outgoing communication in a similar manner. An intended external destination computing system may be, for example, another computing node that is part of the same particular provided virtual computer network (e.g., on a remote virtual client computer network for which the particular provided computer network is an extension, or at another data center 260 that is also used by the configurable network service to provide a portion of the particular virtual computer network), a computing system of a remote resource service, a computing system that is publicly accessible on the Internet, etc. In at least some embodiments and situations, the module 209a may first determine whether to authorize the sending of the outgoing communication, and if so determines the actual physical substrate network location corresponding to the destination network address for the communication. In this example, the determined physical substrate network location corresponds to the external communication manager module 270, such as if the module 270 is associated with all virtual and/or actual network addresses that are not otherwise assigned to node communication manager modules. When the module 270 receives the communication via the interconnection network 220, it similarly extracts the destination network address and additional information from the received communication, and determines whether and how to forward the communication, including optionally determining whether the communication is authorized for the intended destination. If the communication is determined to be authorized (or the module 270 does not perform such an authorization determination), the module 270 then re-headers the incoming communication so that it is directed to the destination using an appropriate IPv4 public network address (or other network address appropriate for the public network 235), and then forwards the modified communication over the public network 235.

Thus, as previously discussed, a variety of techniques may be used to provide load balancing capabilities, including to dynamically scale a group of multiple computing nodes for which the load balancing is performed.

As previously noted, the defined criteria for a group of computing nodes may specify various factors to consider, and various types of actions to take when particular criteria are satisfied. A particular defined criterion may include one or more factors, such as with one or more thresholds for each factor (e.g., an upper threshold that if reached triggers adding a computing node or otherwise expanding use of a computing-related resource, and a lower threshold that if reached triggers removing a computing node or otherwise shrinking use of a computing-related resource), and in some situations may further has an associated minimum time period that the threshold is to be reached or exceeded before the corresponding action is taken. Actions may include, for example, increasing and/or decreasing the quantity of computing nodes that are part of the group, or otherwise modifying computing-related resources that are available to one or more of the group computing nodes. In addition, when different computing nodes of a group are treated differently in one or more manners (e.g., a first group computing node with higher capacity for handling requests may be given a higher weight than another second group computing node with lower capacity, so that the first group computing node is selected to handle incoming requests more often than the second group computing node), the actions may include adjusting how those group computing nodes are treated in various manners (e.g., adjusting weights associated with the group computing nodes; designating that a particular group computing node is not currently accepting new requests but may continue to handle existing ongoing sessions; designating that all received requests be forwarded to another device, such as another DCS Load Balancer module at another geographic location; if multiple remote virtual networks are being used for a group of computing nodes, changing a priority, capacity or other amount of relative use of particular remote virtual networks; etc.). Types of computing-related resources other than computing nodes that may increased, decreased or otherwise modified in at least some embodiments include a quantity of software applications or other software modules being executed, a quantity and/or size of logical storage volumes used by one or more of the group computing nodes, a quantity of DCS load balancer modules used to support a group of computing nodes, etc. Furthermore, dependencies and other relationships between software applications or other resources types may further be specified, such as to create a new logical storage volume for each new instance that is executed of a particular software application (e.g., if a new mail server software instance is executed, a new LDAP server software instance is also executed, and a logical storage volume is provided for use by the LDAP server).

In addition, as previously noted, in some embodiments a DCS Load Balancer module may automatically determine various predictions regarding demand for functionality provided by a group of computing nodes, and in some embodiments an associated user may specify various such predictions. Such predictions may be made for specific times (e.g., the current time, an indicated time period, etc.), and in some cases may vary based on location or other characteristic (e.g., when the computing nodes of a group are geographically distributed, and requests from external computing systems are forwarded to geographically proximate group computing nodes). In addition, in situations in which multiple types of functionality may be provided, the predictions may be made separately for each type of functionality (e.g., for a Web server, for requests for HTTP access versus requests for HTTPS access). Such predictions may be made in various manners, and in some embodiments, a DCS Load Balancer module improves its predictions over time by measuring actual usage in comparison to predicted demand, and adjusting future predictions to reflect discrepancies.

In some embodiments, the DCS Load Balancer module operates by assessing defined criteria and other input information that includes a current state of the group of computing nodes, predictions about current and/or future demand, and information about other factors, and that generates a desired future state of the group of computing nodes. If the desired future state is different from the current state (e.g., by at least a minimum amount), the DCS Load Balancer module may then take actions to reduce or eliminate those differences, whether immediately or at a specified future time. Such assessment of defined criteria and other input information may be performed periodically, continuously, in response to new input information being available, etc. In addition, in situations in which the group computing nodes are in multiple data centers or other geographical locations, each of the geographical locations may in some embodiments have an associated DCS Load Balancer module that initially receives requests from other computing systems proximate to that geographical location, and if so the multiple DCS Load Balancer modules may be configured to work together to balance overall load and to manage aggregate capacity of the group computing nodes, including in some embodiments for a DCS Load Balancer module at a particular geographical location to forward received requests to one or more other DCS Load Balancer modules for handling if the group computing nodes at that particular geographical location are temporarily removed from the group. Furthermore, when the group computing nodes use associated logical storage volumes or other computing-related resources external to the computing nodes, such logical storage volumes or other computing-related resources may in some embodiments have different instances in different geographical locations (with each logical storage volume instance optionally having one or more replicated copies at the same geographical location, such as to increase the I/O access read capacity), while in other embodiments some or all of the geographical locations may share the same instances of logical storage volumes and/or other computing-related resources.

A non-exclusive list of examples of DCS Load Balancer module assessments and actions are as follows: a particular group computing node does not have sufficient available capacity to handle new requests, such as due to processor, memory and/or I/O bandwidth utilization being above a maximum threshold (e.g., based on current demand being higher than predicted demand, or current supply of group computing nodes being below an accurate predicted demand), and if so one or more computing nodes are added to the group (e.g., by reinstating group computing nodes that were temporarily removed from the group, if any, and otherwise adding new computing nodes to the group); a particular group computing node have too much available capacity to handle new requests, such as due to processor, memory and/or I/O bandwidth utilization being below a minimum threshold (e.g., based on current demand being lower than predicted demand, or current supply of group computing nodes being above an accurate predicted demand), and if so one or more computing nodes are temporarily removed from the group (e.g., by instructing the computing node to save any ongoing operational data to long-term storage, and complete any ongoing sessions, and optionally to terminate execution after those other activities are completed); a particular logical storage volume being used by one or more group computing nodes has an I/O bandwidth utilization that is too high, such as by being above a maximum threshold, and if so a new replica logical storage volume is added (e.g., in a nearby location, such as the same data center) and/or at least one of the computing nodes previously using the existing logical storage volume is instructed to stop using the existing logical storage volume; a particular logical storage volume being used by one or more group computing nodes has an I/O bandwidth utilization that is too low, such as by being below a minimum threshold, and if so an existing replica of that logical storage volume is removed (e.g., in a nearby location, such as the same data center) and/or at least one other computing node that was not previously using the existing logical storage volume is instructed to start using the existing logical storage volume; the computing nodes of the group are in multiple geographical locations and the one or more group computing nodes at one of the geographical locations has significantly higher demand than one or more other group computing nodes at another of the geographical locations (e.g., differs by more than a minimum threshold), and if so the DCS Load Balancer module adjusts how requests are being allocated to particular group computing nodes to attempt to rebalance the demand; the computing nodes of the group are in multiple geographical locations but one or more group computing nodes at a first of the geographical locations are temporarily removed from the group and the other group computing nodes at the other geographical locations have capacity that is too low (or demand that is too high), and if so the DCS Load Balancer module adds at least one of the computing nodes at the first geographical location back into the group to increase the aggregate group capacity; the computing nodes of the group are in multiple geographical locations but the aggregate capacity of all of the current group computing nodes is too high (or demand is too low), and if so one or more group computing nodes at a first of the geographical locations are identified to be temporarily removed from the group to reduce the aggregate group capacity; etc.

In addition, as previously noted, in at least some embodiments a DCS Load Balancer module may interact with a remote network-accessible service to modify a quantity of computing nodes of a group or to otherwise modify computing-related resources that are available to one or more group computing nodes, such as a configurable network service that provides virtual computer networks to remote clients. Clients of such a configurable network service may create and configure computer networks provided by the configurable network service in various manners in various embodiments. In at least some embodiments, the configurable network service provides one or more APIs ("application programming interfaces") that enable computing systems of clients to programmatically interact with the configurable network service to perform some or all actions in creating, configuring, and initiating use of computer networks provided by the configurable network service, while in at least some embodiments users who are clients of the configurable network service may interactively interact with the configurable network service to perform some or all such actions (e.g., via a GUI, or graphical user interface, or other console provided by the configurable network service), whether instead of or in addition to performing such actions via use of such APIs. In some embodiments, a GUI available to users may be based on an underlying API that is alternatively available to users, while in other embodiments a GUI may be implemented in other manners. In addition, interactions between computing devices of clients and the configurable network service may be based at least in part on electronic messages (e.g., email messages) sent between the client computing devices and the configurable network service, such as in accordance with a message-based API of the configurable network service. The configurable network service or other network-accessible service may also in at least some embodiments be a fee-based service, such that users of the network-accessible service are customers that pay fees to the network-accessible service for at least some of the functionality provided by the network-accessible service.

For example, in at least some embodiments, a client may interact with an embodiment of the configurable network service to specify configuration information for a computer network to be provided for the client, with the configuration information optionally including a variety of types of information such as one or more of the following non-exclusive list: multiple specified network addresses to be assigned to multiple computing nodes of the provided computer network; specified network topology information for the provided computer network; and specified network access constraints for the provided computer network. The multiple specified network addresses may include, for example, one or more ranges of network addresses, and if the computer network being provided is an extension to a remote private computer network of a client, may correspond to a subset of virtual and/or private network addresses used for the remote private computer network. The specified network topology information may indicate, for example, subsets of the computing nodes of the provided computer network to be grouped together or that are to otherwise share common intercommunication characteristics, such as by specifying one or more networking devices to be part of the provided computer network (e.g., routers, switches, etc.) and that manage or are otherwise associated with computing nodes having particular specified network addresses, or by otherwise indicating subnets of the provided computer network or other groupings of the computing nodes of the provided computer network. The specified network access constraint information may indicate, for example, for each of one or more of the provided computer network's computing nodes, which other computing nodes may intercommunicate with the computing node and/or the types of communications allowed to and/or from the computing node, including whether the computing nodes of the provided computer network are allowed to communicate with any computing nodes external to the provided computer network (or in cases in which the provided computer network is an extension to an existing other computer network, whether the computing nodes of the provided computer network are allowed to communicate with any computing nodes external to that other computer network to which it belongs).

In addition, in at least some embodiments, the computing nodes used by the configurable network service to provide computer networks to clients may have various forms, such as physical computing systems and/or virtual machines that are each hosted on one or more physical computing systems. For example, in some embodiments, the configurable network service may include a large number of computing nodes that are provided by the configurable network service to be available for use in computer networks provided to clients, such as in one or more data centers in one or more geographical locations. In addition, in at least some embodiments, some or all of the computing nodes provided by the configurable network service are interconnected by one or more intermediate physical networks, and the computer networks provided to clients may be virtual (or "logical") networks that are overlaid over the intermediate physical networks by using the intermediate physical networks as a substrate network. Furthermore, in at least some embodiments, at least some of the computing nodes may be used by a program execution service (or "PES") that executes multiple programs on behalf of multiple customers or other users of the program execution service. Additional details related to computing nodes and underlying computer networks are included below, and additional details related to example embodiments of providing virtual networks to clients and providing a program execution service are included in U.S. application Ser. No. 12/332,214, filed Dec. 10, 2008 and entitled "Providing Access to Configurable Private Computer Networks;" in U.S. application Ser. No. 11/394,595, filed Mar. 31, 2006 and entitled "Managing Communications Between Computing Nodes;" in U.S. application Ser. No. 11/395,463, filed Mar. 31, 2006 and entitled "Managing Execution of Programs by Multiple Computing Systems;" in U.S. application Ser. No. 11/692,038, filed Mar. 27, 2007 and entitled "Configuring Intercommunications Between Computing Nodes;" in U.S. application Ser. No. 12/060,074, filed Mar. 31, 2008 and entitled "Configuring Communications Between Computing Nodes;" and in U.S. application Ser. No. 11/764,739, filed Jun. 18, 2007 and entitled "Providing Enhanced Access To Remote Services;" each of which is incorporated herein by reference in its entirety.

In some embodiments, a client may further configure a computer network provided by the configurable network service to provide access to one or more other network-accessible services that are remote from the provided computer network, such as other remote network-accessible services that are accessible over the Internet or other public networks, or that are otherwise external to and not part of the provided computer network. At least some such remote services may in some embodiments be affiliated with the configurable network service (e.g., provided by an operator of the configurable network service or an affiliated entity; provided by another client of the configurable network service, such as via a computer network being provided to that other client by the configurable network service, etc.), and at least some such remote services in some embodiments may instead be independent of the configurable network service. Such other remote services may have various forms in various embodiments, including services that provide network access to one or more types of computing-related resources (e.g., storage services that provide access to stored data resources, messaging services that provide access to message queue resources or other stored message resources, database services that provide access to stored database resources, program execution services that provide access to program execution resources, etc.) for use by remote computing systems, or that otherwise provide access to information or functionality or other resources of use (e.g., a service that provides stock quote information resources or search query results resources; a service that provides photo sharing functionality resources or social networking capability resources; etc.). In some situations, an embodiment of the configurable network service may provide a plurality of computing nodes at a data center or other geographical location, and may use subsets of those computing nodes to provide different computer networks to different clients (e.g., with each provided computer network being a distinct virtual network that shares a common substrate network)—in such situations, one client may configure the provided computer network for that client to provide access to one or more network-accessible remote services that are provided by other of the clients using other of the provided computer networks at that geographical location, such as without the one client being aware that those remote resources are physically provided by other computing nodes at the same geographical location.

Thus, as described above with respect to FIG. 2, in at least some embodiments, the network-accessible configurable network service provides virtual computer networks to clients by implementing them as overlay networks using an underlying substrate network, such as using various communication manager modules of the configurable network service. One or more system manager modules of the configurable network service may further facilitate configuring communications between computing nodes, such as by tracking and/or managing which computing nodes belong to which provided virtual networks, and by providing information about actual physical substrate network addresses that correspond to virtual network addresses used for a particular virtual network (e.g., by a particular customer or other entity). In addition, a system manager module may receive an indication of a virtual machine computing node on a target physical computing system and of a provided virtual network to which the virtual machine is to be associated, and then initiate configuration of a virtual machine node communication manager module for the target physical computing system so as to associate the virtual machine with the virtual network, or the node communication manager module may instead initiate that configuration (e.g., when the virtual machine first initiates or receives a communication). In some embodiments, a system manager module and/or an associated node communication manager module may further participate in provisioning a particular virtual machine computing node of a provided virtual network in various manners (e.g., in response to instructions from a user associated with the provided virtual network), such as to take indicated actions so that the virtual machine computing node is ready to execute one or more software applications when the user associated with the provided virtual network initiates that execution, and/or to initiate execution of one or more indicated software applications on the virtual machine computing node on behalf of the user.

Figure 3:
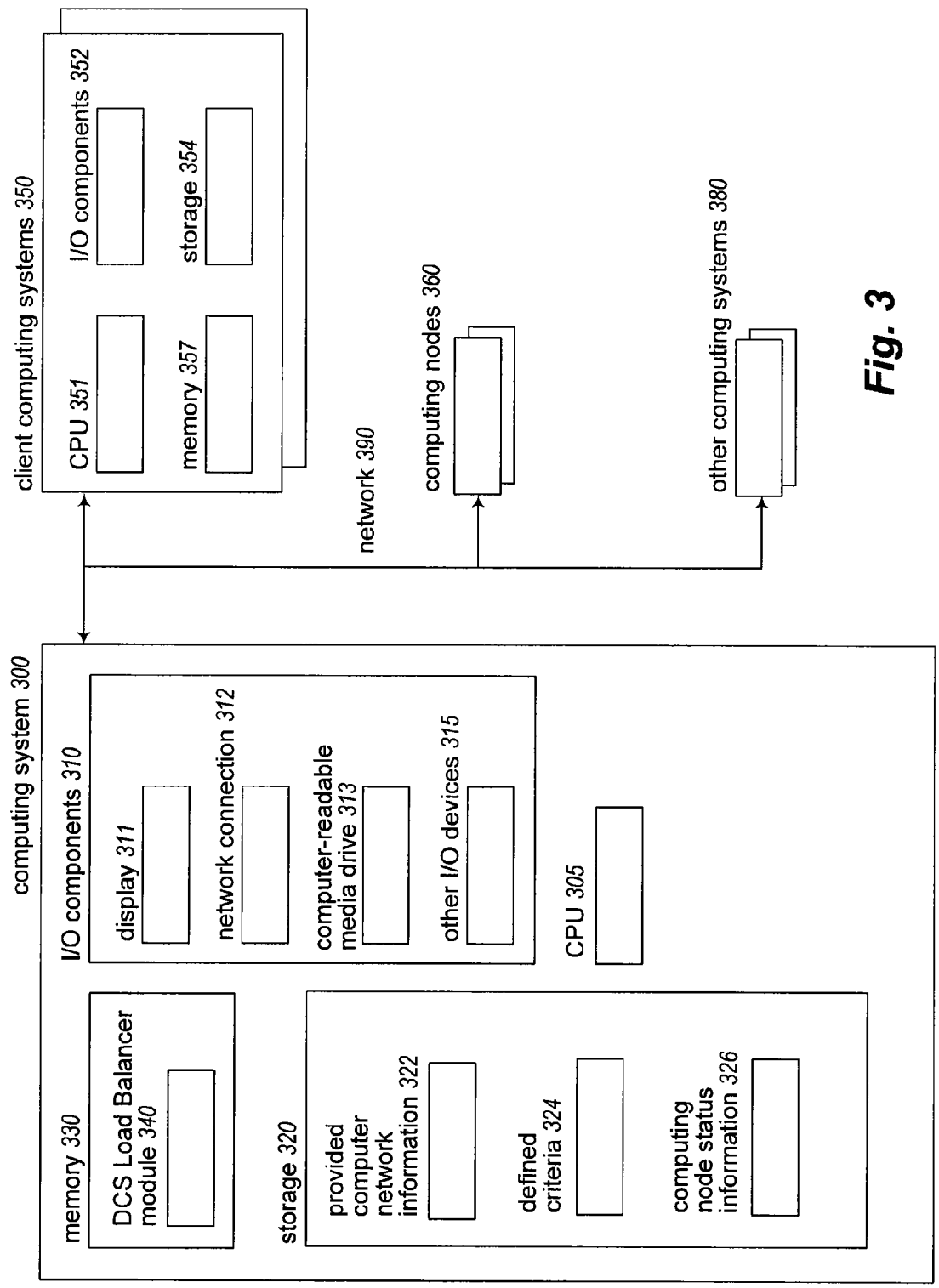
FIG. 3 is a block diagram illustrating example computing systems suitable for providing dynamically scalable load balancing capabilities.

FIG. 3 is a block diagram illustrating example computing systems suitable for providing load balancing functionality by dynamically scaling a group of multiple computing nodes for which the load balancing is performed. In particular, FIG. 3 illustrates a computing system 300 suitable for executing an embodiment of a DCS Load Balancer module that provides load balancing functionality for an associated group of multiple computing nodes, as well as various client computing systems 350, computing nodes 360, and other computing systems 380. While not illustrated here, in some embodiments at least some of the illustrated computing systems and computing nodes may be co-located or otherwise associated (e.g., the computing system 300 and at least some of the computing nodes 360), such as by being part of a single computer network and/or at a common data center, as described in greater detail with respect to FIGS. 1B and 2. In addition, while not illustrated here, a configurable network service may be accessible to the DCS Load Balancer module and used in at least some embodiments, such as from one or more of the other computing systems 380, and if so at least some of the computing nodes 360 may be provided by the configurable network service and be located remotely from other of the computing nodes 360.

In the illustrated embodiment, the computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computing systems 350 have components similar to those of server computing system 300, including a CPU 351, I/O components 352, storage 354, and memory 357. The other computing systems 380 and computing nodes 360 may also each include similar components to some or all of the components illustrated with respect to server computing system 300, but such components are not illustrated in this example for the sake of brevity. In addition, an embodiment of a Dynamic Computing Scaling ("DCS") Load Balancer module 340 is executing in memory 330. While the DCS Load Balancer module is illustrated in this example as being part of a configured general-purpose computing system, in other embodiments the computing system 300 may instead be a special-purpose device that is designed and/or configured to provide the load balancing capabilities of the DCS Load Balancer module (e.g., based on using one or more network processors).

The executing DCS Load Balancer module interacts with other computing systems and computing nodes over one or more networks 390 (e.g., via the Internet and/or the World Wide Web, via a private cellular network, via a private substrate network in use by the configurable network service, etc.). In this example embodiment, the module 340 is associated with a group of multiple of the computing nodes 360 in order to provide load balancing functionality for those computing nodes. The multiple computing nodes 360 of the group, and optionally at least some of the other computing systems 280 may be associated with a particular user or other entity, such as by being part of one or more physical computer networks of that entity, and that user (or a user representing that entity) may use one of the client computing systems 350 to configure and access the computing nodes and computing systems of that computer network. The multiple computing nodes of the group may provide one or more types of functionalities that are available to at least some of the other computing systems 380 (e.g., to other computing systems that are part of the same physical computer networks as the computing nodes of the group; to other external computing systems, such as over the Internet; etc.), such as based on each executing one or more software applications (not shown). For example, one of the other computing systems 380 may attempt to access functionality of the group of computing nodes by sending a request that is directed to the DCS Load Balancer module 340. The module 340 may use various information 322 on storage 320 about the computing nodes of the group to select at least one of the group computing nodes to handle the request, and forwards request to the selected group computing node(s), such as by sending the request to the selected group computing node(s) over the network 390, by instructing the requesting computing system 380 to redirect the request to the selected group computing node(s), etc.

In addition, the DCS Load Balancer module 340 may take various actions to dynamically scale the associated group of computing nodes at various times. In the illustrated embodiment, the module 340 may have access to various defined criteria 324 on storage 320 that relate to types of actions that the module 340 may take when associated criteria are satisfied by current conditions. As discussed in greater detail elsewhere, the associated criteria may be based on various factors, such as current computing load and other status of the current computing nodes of the group, actual and/or predicted demand for the functionality provided by the group of computing nodes, monetary and other costs associated with the use of particular computing nodes, etc. The types of actions that the module 340 may take at various times include, for example, expanding and/or shrinking the quantity of computing nodes of the associated group. The expanding may include, for example, repurposing other existing computing systems 380 of the same physical computer network to now provide the functionality of the group computing nodes, accessing other remote computing systems 380 and adding them to the computing nodes 360, etc. In addition, the module 340 may access and use various current status information 326 regarding the computing nodes of the group, such as status information that the module 340 requests and gathers (e.g., periodically), and/or status information that is pushed to the module 340 (e.g., periodically, upon the occurrence of events of interest, etc.), such as by the computing nodes of the group and/or other computing systems.

In some particular embodiments, remote computing systems are added to the computing nodes 360 by interacting with a remote configurable network service that provides virtual computer networks to clients. For example, the other computing systems 380 may include computing systems of the configurable network service that are available for use in provided computer networks, such as host computing systems that may each host one or more computing nodes. In some such situations, a user of a client computing system 350 may first interact with the configurable network service to configure a particular virtual computer network from the configurable network service (e.g., as an extension to the physical computer network that includes the group of computing nodes), and may configure the information 322 to associate that virtual computer network with the group of computing nodes—if so, the module 340 may use that configured information to access that provided virtual computer network of the configurable network service as part of the dynamic scaling of the group of computing nodes. In other situations, the module 340 may instead be configured to interact with the configurable network service to create one or more such virtual computer networks for use by the module 340, such as to use a particular provided virtual computer network from the configurable network service to dynamically scale one or more distinct groups of computing nodes for which the module 340 is providing load balancing capabilities.

The other computing systems 350 and 380 and computing nodes 360 may be executing various software as part of interactions with the module 340. For example, some or all of the client computing systems 350 may each be executing software in memory 357 to interact with module 340 (e.g., as part of a Web browser or specialized client-side application program), such as to enable a user of a client computing system to configure operations of the module 340 with respect to a group of computing nodes associated with the user. Furthermore, some or all of the client computing systems 350 and/or other computing systems 380 may each be executing software in memory 357 to interact on behalf of a client with a computer network being provided by a configurable network service for the client, such as via a VPN connection that connects multiple of the other computing systems 380 that are part of a remote network for a client to multiple of the computing nodes 360 as part of a provided computer network extension for the client's remote network. Furthermore, some of the computing nodes 360 and/or the other computing systems 380 may execute software modules (not shown) to assist in providing the functionality of the module 340, such as communication manager modules that assist in managing communications sent to and from computing nodes and that provide status information regarding those computing nodes to the module 340, or computing nodes 360 that similarly include software to provide such status information to the module 340. In addition, other of the computing systems 380 may perform other functions, such as to execute remote resource services available to various users.

It will be appreciated that computing systems 300, 350 and 380 and computing nodes 360 are merely illustrative and are not intended to limit the scope of the present invention. The computing systems and/or computing nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware or software that may interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated module 340 may in some embodiments be distributed in additional modules, or the module 340 may in some embodiments be integrated with or otherwise associated with a configurable network service, and if so may also incorporate functionality described elsewhere as being provided by one or more modules of the configurable network service (e.g., one or more system manager modules, one or more node communication manager modules, one or more external communication manager modules, etc.). Similarly, in some embodiments, some of the functionality of the module 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. In addition, the storage that is used by the DCS Load Balancer module 340 may in some embodiments be located partially or wholly on computing system 300, while in other embodiments may be located partially or wholly external to computing system 300 (e.g., as network-accessible storage, such as provided on one or more other computing systems 380 and/or other network-accessing storage devices). Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FP- GAs), complex programmable logic devices (CPLDs), network processors, etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 5:
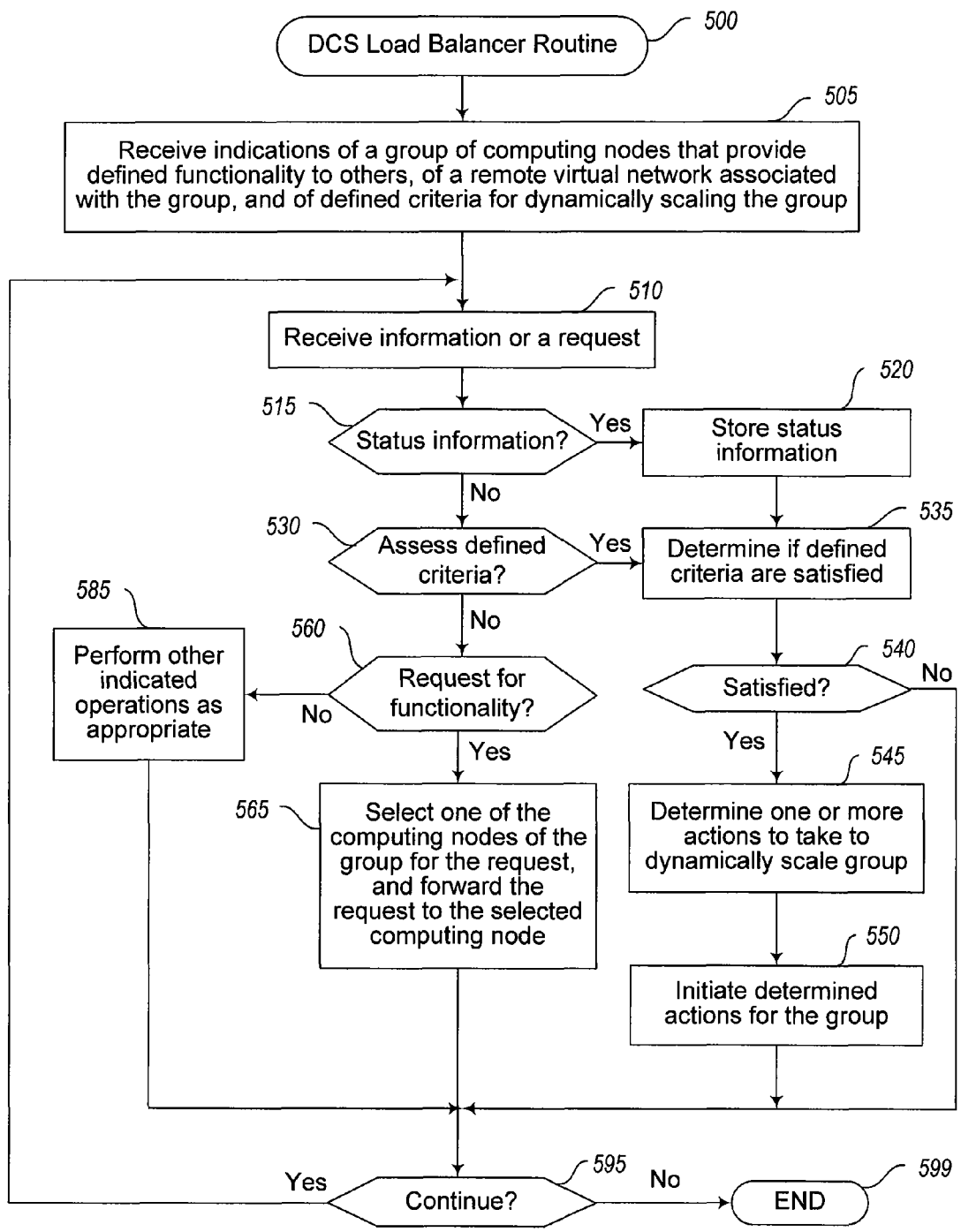
FIG. 5 illustrates a flow diagram of an example embodiment of a DCS Load Balancer routine.

FIG. 5 is a flow diagram of an example embodiment of a DCS Load Balancer routine 500. The routine may be provided by, for example, execution of the DCS Load Balancer modules 125, 164 and 192 of FIGS. 1A and 1B and/or of the DCS Load Balancer module 340 of FIG. 3, such as to provide dynamically scalable load balancing capabilities in at least some embodiments. In the illustrated embodiment, each DCS Load Balancer module manages a single associated group of multiple computing nodes at a single time, although in other embodiments a single DCS Load Balancer module may simultaneously manage multiple distinct associated groups of multiple computing nodes (e.g., for multiple distinct users or other entities, such as if the DCS Load Balancer module is provided by a configurable network service that provides virtual computer networks and associated load balancing capabilities to multiple remote clients).

The illustrated embodiment of the routine begins at block 505, where an indication is received of configuration information for the routine. In the example embodiment, the configuration information may include, for example, information about a group of multiple computing nodes that provide a defined type of functionality to others, of a remote virtual network associated with the group of computing nodes, and of defined criteria for use in determining when and how to dynamically scale the group. Thus, in the illustrated embodiment, the routine 500 receives information about an existing remote virtual network to use in the dynamic scaling, although in other embodiments the routine may instead dynamically interact with a remote network-accessible service to create such a remote virtual network or to otherwise obtain access to one or more remote computing nodes to add to the group of computing nodes.

In the illustrated embodiment, the routine continues to block 510 where it receives a request or information. In block 515, if it is determined that computing status information is received in block 510 related to the group of computing nodes, the routine continues to block 520 to store that status information. In the illustrated example, the routine then continues to block 535 to determine if the defined criteria for the group of computing nodes are currently satisfied, such as based at least in part on the received status information, although in other embodiments the defined criteria may not be checked each time that status information is received. The status information may be received in various manners, such as if pushed to the routine 500 from the computing nodes of the group or from other computing systems with access to status information about the computing nodes, or as part of responses from those computing nodes or other computing systems to previous requests from the routine 500 (e.g., with respect to block 585, as discussed below). In addition, the status information may include information supplied by a user associated with the group of computing nodes or from another entity, such as predictions regarding demand for the functionality provided by the group of computing nodes, monetary costs and other costs associated with use of particular computing nodes, etc.

If it is instead determined in block 515 that status information is not received, the routine continues instead to block 530 to determine if the information or request received in block 510 is an instruction to assess the defined criteria for the group of computing nodes to determine whether to currently perform scaling of the group, such as an instruction from a user associated with the group, an instruction that is triggered periodically or under specified circumstances, etc. If so, the routine continues to block 535 to assess the defined criteria for the group of computing nodes to determine if one or more of the defined criteria are currently satisfied, such as based at least in part on the previously received status information stored with respect to block 520. As discussed in greater detail elsewhere, such defined criteria may be based on a variety of factors. For example, one defined criterion may indicate that if two or more group computing nodes have average processor utilization over the previous 10 minutes of more than 80%, then to add another computing node, and another defined criterion may indicate that if any group computing node has both an average processor utilization over the previous 10 minutes of less than 80% and an average network utilization over the previous 15 minutes of less than 30%, then to temporarily remove that computing node (or, alternatively, if the computing node is a local computing node that is part of a physical computer network, one remote group computing node provided by a network-accessible service) from the group for a period of one hour. If it is determined in block 540 that one or more of the defined criteria are satisfied, the routine continues to block 545 to determine one or more associated actions to be taken in response to the satisfaction of the defined criteria (e.g., based on those actions being associated with those satisfied criteria), such as to dynamically scale or otherwise modify the group of computing nodes in one or more manners, and in block 550 the routine initiates the determined actions. As discussed in greater detail elsewhere, the determined actions may include dynamically scaling the group of computing nodes by adding one or more computing nodes to the group and/or removing one or more computing nodes from the group, such as by programmatically interacting with a remote network-accessible service that provides access to such computing nodes (e.g., a configurable network service).

If it is instead determined in block 530 that the received request or information is not to assess the defined criteria, the routine continues instead to block 560 to determine if a request has been received from another computing system for the functionality provided by the group of computing nodes. If so, the routine continues to block 565 to select one or more of the computing nodes of the group for the request, and to forward the request to the selected computing nodes to be handled. For example, the computing nodes of the group may be alternative Web servers that provide access to the Web pages and associated functionality for a particular Web site, and a particular Web server may be selected to receive a request and begin an ongoing session with a particular external computing system. As part of handling the initial request, the Web server may optionally interact with other associated computing systems for the Web site (e.g., computing systems that provide an application server and/or database server), and additional requests as part of the ongoing session may in some embodiments occur directly between the selected Web server computing node and the external computing system, although in other embodiments the additional requests may be routed through the routine 500 and associated DCS Load Balancer module and forwarded to that same previously selected Web server computing node (e.g., by the DCS Load Balancer module maintaining a mapping between that external computing system and that selected Web server computing node).

If it is instead determined in block 560 that the received request or information is not a request for the functionality of the associated group of computing nodes, the routine continues instead to block 585 to perform one or more other indicated operations as appropriate. For example, other types of operations may include requesting group computing nodes or other associated computing systems to provide current status information (e.g., periodically, upon the occurrence of particular situations, etc.). In addition, in some embodiments the routine may automatically determine some types of information in certain situations, such as to automatically learn some or all of the defined criteria for use in the dynamic scaling (e.g., by assessing when particular thresholds or other values for various factors correspond to particular increases or decreases in measures of effectiveness of the group of computing nodes in providing their functionality), to automatically predict expected demand or other related use of the group of computing nodes (e.g., based on trends or other patterns in previous usage data), etc. Other operations may also include various types of administrative or housekeeping actions in at least some embodiments and situations.

After blocks 550, 565, or 585, or if the routine instead determines in block 540 that the defined criteria were not satisfied, the routine continues to block 595 to determine whether to continue, such as until an explicit indication to terminate is received. If it is determined to continue, the routine returns to block 510, and if not continues to block 599 and ends.

Figure 4A:
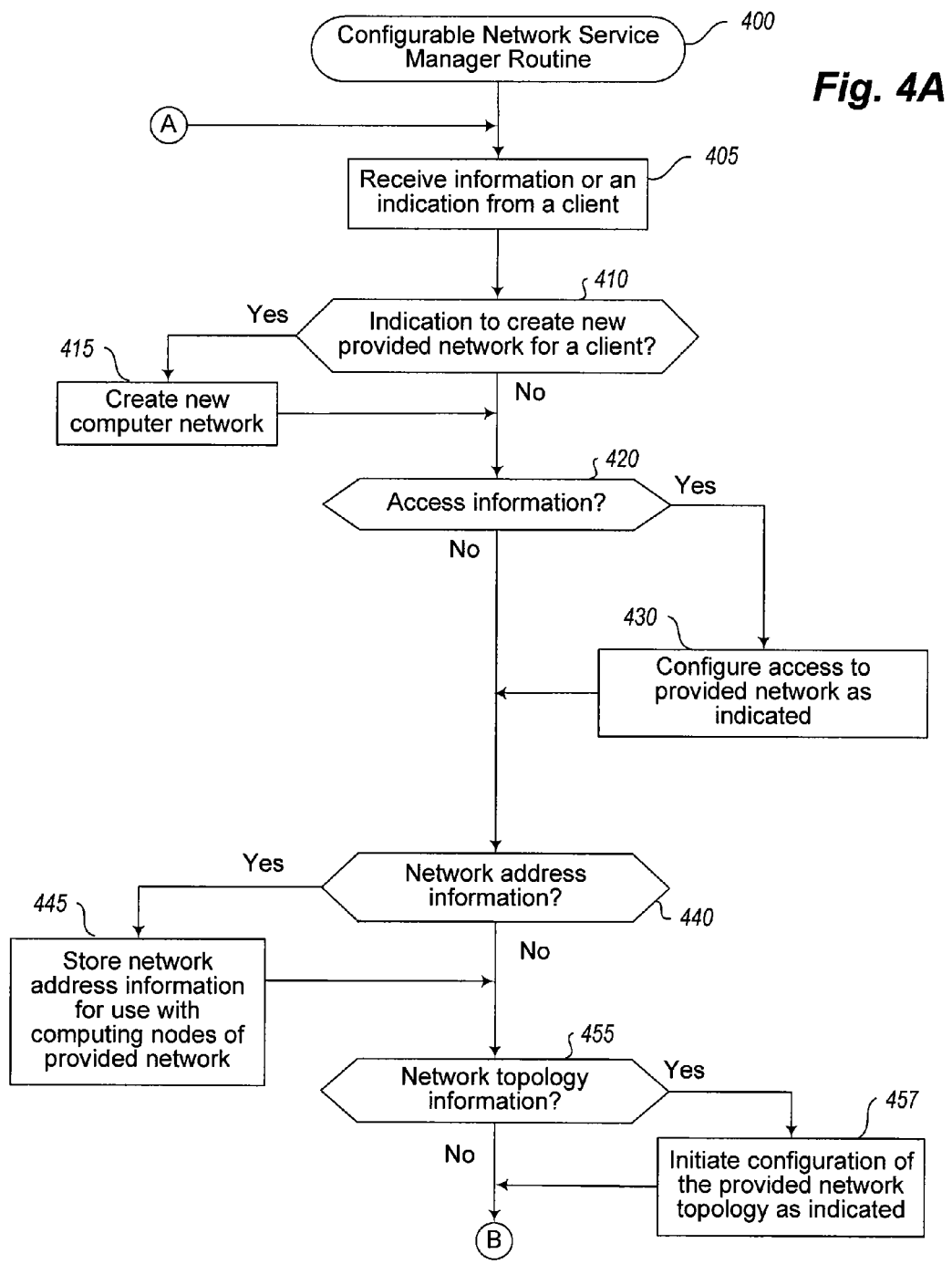
FIGS. 4A and 4B illustrate a flow diagram of an example embodiment of a Configurable Network Service Manager routine.
Figure 4B:
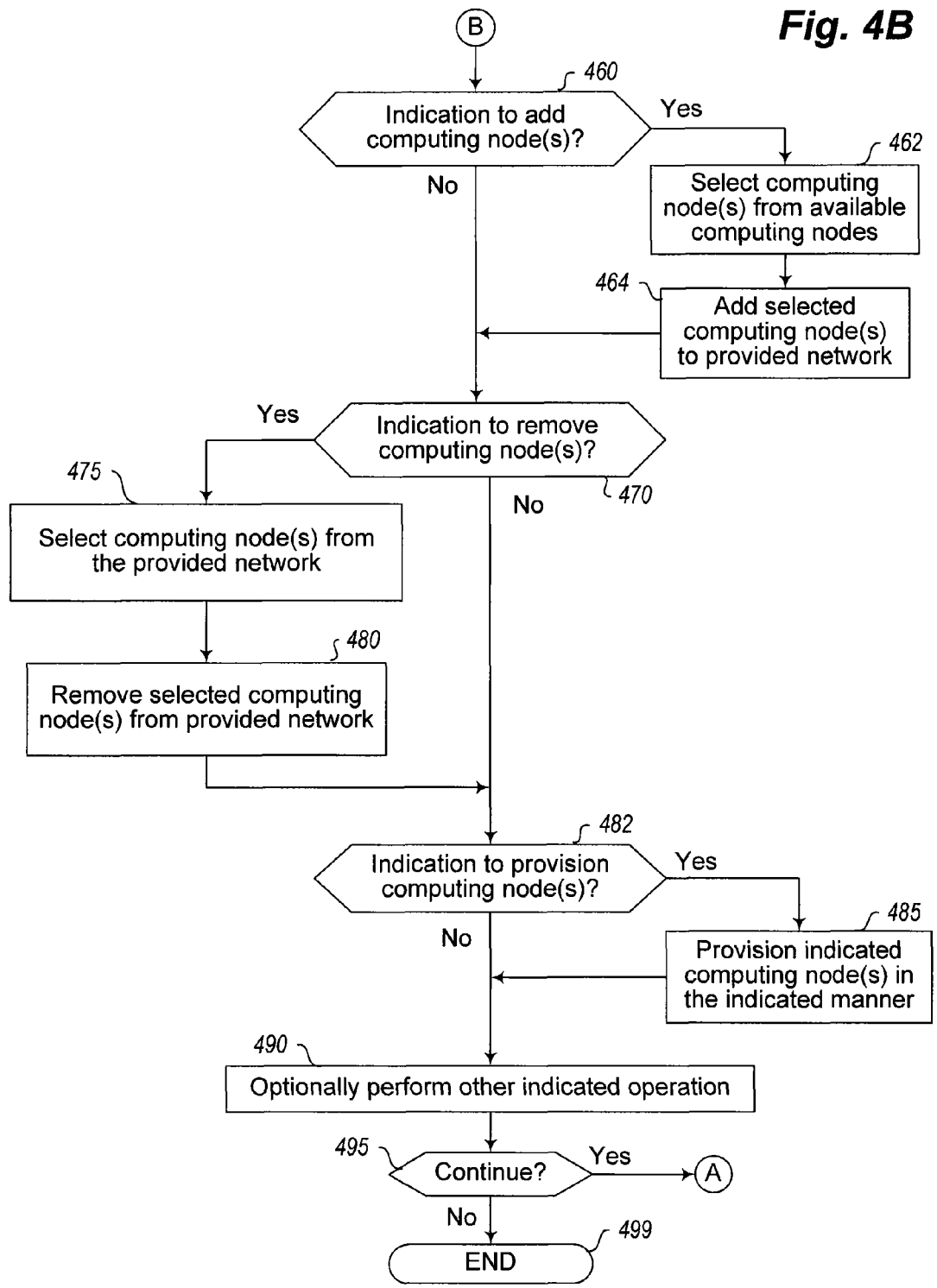

FIGS. 4A and 4B illustrate a flow diagram of an example embodiment of a Configurable Network Service Manager routine 400. The routine may be provided by, for example, execution of the system manager module 110 of FIG. 1A and/or execution of a network-accessible service that uses one or more of the other computing systems 380 of FIG. 3, such as to assist in managing operations of a configurable network service that provides computer networks to remote clients. In the illustrated embodiment, at least some of the computer networks that are created and provided by the routine 400 may be extensions to existing remote networks of clients, while in other embodiments the networks that are created and provided by the routine 400 may instead be standalone networks for use by clients that are not extensions of other networks. In addition, at least some of the provided computer networks may be used by embodiments of the DCS Load Balancer modules to dynamically scale associated groups of computing nodes, as discussed with respect to FIG. 5 and elsewhere.

The illustrated embodiment of the routine begins at block 405, where an indication is received of a message (e.g., from a DCS Load Balancer module or other client) or other information that is received. In at least some embodiments, the configurable network service that the routine 400 supports provides one or more APIs to allow remote clients to programmatically interact with the configurable network service, and if so some or all of the indications received in block 405 may be made via invocations or other programmatic interactions of remote clients with those APIs, while in other embodiments and situations, some or of the indications received in block 405 may instead be initiated by remote clients or others in other manners.

After block 405, the routine continues to block 410 to determine whether the indication received in block 405 is to initiate the creation of a new computer network to be provided on behalf of a requesting client, such as an extension to an existing remote network of the client. If so, the routine continues to block 415 to perform various actions to create the new computer network extension or other new computer network on behalf of the client. For example, as described in greater detail elsewhere, the received communication to create the new computer network may include various configuration information related to the computer network to be created, such as a number of computing nodes that are to be part of the created computer network, an indication of whether the new computer network is an extension to another remote network, etc. The actions taken in block 415 may include, for example, selecting particular computing nodes that are available from the configurable network service for use in the new computer network that is being created; generating and associating a unique identifier with the new computer network that is being created; storing any received configuration information for later use; etc. As described in greater detail elsewhere, such computing nodes may be selected from a group of available computing nodes in various manners in various embodiments, such as based on capabilities of the selected computing nodes, based on network locations of the selected computing nodes (e.g., on an underlying substrate network of the configurable network service, on a relative network location to other computing nodes of the computer network, etc.), based on geographic locations of the selected computing nodes (e.g., in one of multiple geographically distributed data centers, on a relative geographic location to other computing nodes of the computer network, etc.), in a random manner, etc. Furthermore, while not illustrated here, the routine may provide to the client the unique identifier for the new computer network or other reference for the new computer network, so as to allow the client to later reference the new computer network when performing further configuration of the new computer network.

After block 415, or if it is instead determined in block 410 that the indication received in block 405 is not to create a new computer network, the routine continues to block 420 to determine whether the indication received in block 405 includes information related to access constraints or other access information for an indicated computer network. For example, in some situations, a client may supply one or more requests or other messages that are received and processed together with respect to block 405, such as a request to create a new computer network extension and various specified configuration information for that new computer network extension—if so, the indicated computer network for which access information is supplied may be the new computer network extension that was just created with respect to block 415. In other situations and embodiments, a remote client may instead supply different communications at different times that are received and processed with respect to block 405, such as an initial request to create a new computer network, and later one or more other separate requests to specify various types of configuration information for that previously created computer network. If it is determined in block 420 that access information is received in block 405, the routine continues to block 430 to use specified access constraint information for the indicated computer network to configure allowable access for the indicated computer network. As described in greater elsewhere, such configuration information may include constraints as to whether any of the computing nodes of the computer network are allowed to have access to the Internet or otherwise outside the computer network, as well as to optionally specify communication access policies between computing nodes of the computer network (including remote parts of the computer network if the indicated computer network is an extension to a remote computer network). Accordingly, in block 430, the routine takes one or more actions that may include, for example, configuring routing information to be used by communication manager modules of the configurable network service that support the computer network (e.g., by sending a message to those communication manager modules with the information to be configured). Furthermore, if the access information includes instructions to establish a VPN connection from a remote client location to the provided computer network, the actions taken in block 430 may further include taking actions to support such a VPN connection by the provided computer network or otherwise by the configurable network service on behalf of the provided computer network, such as by configuring the provided computer network to accept such a VPN connection and to use appropriate information to decrypt communications that are encrypted for the VPN connection.

After block 430, or if it instead determined in block 420 that the indication in block 405 does not include access information, the routine continues to block 440 to determine whether the indication in block 405 includes network address information for an indicated computer network, such as one or more network address ranges and/or network addresses specified in another form. If so, the routine continues to block 445 to store the specified network address information for use with the computing nodes of the indicated computer network, and may further proceed to associate those specified network addresses with the computing nodes of the indicated computer network if those computing nodes have already been selected or otherwise put into use, such as with respect to blocks 415 and/or 462. The associating of specified network addresses with computing nodes of a computer network may further include configuring routing information to be used by communication manager modules that support the computer network, as described in greater detail elsewhere. After block 445, or if it is instead determined in block 440 that the indication received in block 405 did not include network address information, the routine continues to block 455 to determine whether the indication received in block 405 includes network topology information for an indicated computer network. If so, the routine continues to block 457 to store the network topology information for the indicated computer network, and to optionally proceed to configure that indicated computer network in accordance with the network topology information. The configuring of network topology information may include configuring routing information to be used by communication manager modules that support the computer network, such as to simulate actions of virtual networking devices that are part of the specified topology information.

After block 457, or if it instead determined in block 455 that the indication in block 405 does not include network topology information, the routine continues to block 460 to determine whether the indication in block 405 includes an indication to add computing nodes to an indicated computer network, such as if the indicated computer network has been configured to include a specified quantity of computing nodes but less than that specified quantity have been selected and put into use. Furthermore, in some embodiments, a client may modify an existing computer network being provided by the configurable network service in various manners even after use of the computer network has been ongoing, including to modify the quantity of computing nodes of the computer network and/or to modify that network topology information for the computer network. As discussed in greater detail elsewhere, the request to add the one or more computing nodes may be received from a DCS Load Balancer module as part of the dynamic scaling of a group of computing nodes to include the added computing nodes in the group. If it is determined in block 460 that the indication is to add one or more computing nodes, the routine continues to block 462 to select one or more computing nodes to be added to the indicated computer network from a group of available computing nodes of the configurable network service. As described in greater detail elsewhere, such computing nodes may be selected in various manners. In block 464, the selected computing nodes are then added to the computer network, such as in a manner similar to that previously discussed (e.g., by associating appropriate network address information with those selected computing nodes, by setting access rights for those selected computing nodes in accordance with any specified network topology information and/or other access constraint information for the computer network extension, etc.).

After block 464, or if it is instead determined in block 460 that the indication in block 405 is not to add computing nodes, the routine continues to block 470 to determine whether the indication in block 405 is to remove one or more computing nodes from an indicated computer network, such as from a DCS Load Balancer module as part of the dynamic scaling of a group of computing nodes to remove the computing nodes from the group. If it is determined in block 470 that the indication is to remove one or more computing nodes, the routine continues to block 475 to select one or more computing nodes to be removed from the indicated computer network, such as based on an indication of the selected computing nodes in the request, or instead in another manner (e.g., randomly, based on convenience or benefit of the configurable network service, etc.). In block 480, the selected computing nodes are then removed from the computer network.

After block 480, or if it is instead determined in block 470 that the indication in block 405 is not to remove one or more computing nodes, the routine continues instead to block 482 to determine whether the indication in block 405 is to provision one or more computing nodes of an indicated computer network, such as one or more computing nodes just added with respect to block 464, or one or more computing nodes that were previously part of the indicated computer network but used for other purposes (or not currently being used). If so, the routine continues to block 485 to initiate the provisioning of the indicated computing node(s) in the indicated manner, such as to execute one or more indicated software applications on each of the computing nodes, and/or to otherwise prepare the computing nodes to execute one or more such software applications. In other embodiments, such provisioning of computing nodes may instead be performed directly by clients of the configured network service based on interactions of the clients directly with those computing nodes.

After block 485, or if it is instead determined in block 482 that the indication in block 405 is not to provision one or more computing nodes, the routine continues to block 490 to optionally perform one or more other indicated operations as appropriate. For example, after completing the configuration of a particular computer network for a client, the routine may further take one or more final steps to provide access to the computer network from remote sources, such as from a remote computer network to which a created new computer network extension belongs. Such providing of access may include, for example, providing information to the client to enable the client to access the computer network (e.g., a publicly accessible network address for a VPN to the computer network), configuring the computer network to accept communications from the remote client, etc. In addition, the routine may further perform other operations at times (e.g., periodically, when current conditions exceed a specified threshold or otherwise trigger a specified condition, etc.), such as to ping or otherwise check the status of some or all computing nodes for some or all computer networks, monitor the use of some or all computer networks by remote clients, monitor the use of internal configurable network service resources by some or all provided computer networks, establish and maintain accounts of clients with the configurable network service, respond to requests from clients for status information about their accounts or about their provided computer networks, proactively send status information to DCS Load Balancer modules regarding computing nodes that the DCS Load Balancer modules are currently using as part of associated groups of computing nodes, obtain payment from clients for use of the configurable network service, modify the particular computing nodes that are part of an indicated computer network (e.g., by moving one or more executing programs from a computing node at a first geographical location to a new computing node at a second geographical location), etc. After block 490, the routine continues to block 495 to determine whether to continue, such as until an explicit indication to terminate is received. If it is determined to continue, the routine returns to block 405, and if not continues to block 499 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

The invention claimed is:

1. A non-transitory computer-readable medium whose contents are instructions that, when executed, configure a device to provide load balancing capabilities by performing a method comprising:
   for each of one or more requests received for functionality that is available from each of multiple computing nodes of a group at a first location, selecting at least one of the computing nodes of the group to handle the request;
   determining that one or more defined criteria for the group are satisfied, and initiating a modification to the group of computing nodes, the modification to the group including modifying use as part of the group of one or more additional computing nodes at a second location remote from the first location; and
   for each of one or more additional requests for the available functionality, selecting at least one of the computing nodes of the modified group to handle the additional request, such that at least one additional computing node at the remote second location is selected for at least one of the additional requests.

2. The non-transitory computer-readable medium of claim 1 wherein the multiple computing nodes of the group are associated with a first entity that specifies the defined criteria for the group, wherein the defined criteria are based at least in part on status information obtained about one or more of the computing nodes that are part of the group before the initiating of the modification to the group, wherein the computing nodes of the group each execute a copy of one or more software applications to provide the available functionality, and wherein the one or more requests and the one or more additional requests are each from one or more computing systems that are not part of the group to obtain the available functionality from the one or more software applications.

3. The non-transitory computer-readable medium of claim 2 wherein the modifying of the use of the one or more additional computing nodes at the remote second location includes at least one of adding the one or more additional computing nodes to the group and of removing the one or more additional computing nodes from the group.

4. The non-transitory computer-readable medium of claim 3 wherein the multiple computing nodes that are part of the group before the initiating of the modification are part of a computer network at the first location and are under control of the first entity, wherein the one or more additional computing nodes at the remote second location are part of a first virtual computer network at the remote second location and are under control of a distinct second entity, wherein the second entity provides a network-accessible service that enables clients to configure virtual computer networks provided by the network-accessible service on behalf of the clients, wherein the first entity is one of the clients of the network-accessible service, and wherein the first virtual computer network is one of the virtual computer networks provided by the network-accessible service.

5. The non-transitory computer-readable medium of claim 1 wherein the computer-readable medium is a memory of the configured device that stores the contents.

6. A computer-implemented method for providing load balancing capabilities, the method comprising:
   under control of one or more computing devices providing load balancing capabilities for a group of multiple computing nodes providing a type of network-accessible functionality, the multiple computing nodes belonging to one or more computer networks,
   after receiving one or more requests from one or more computing systems for the provided type of functionality, selecting for each of the received requests one of the computing nodes of the group to respond to the request;

after the receiving of the one or more requests, automatically determining that one or more defined criteria for the group are satisfied, the one or more defined criteria being based at least in part on status information for one or more of the computing nodes of the group;

in response to the determining that the one or more defined criteria are satisfied, automatically initiating a modification to the group of computing nodes, the modification to the group including adding one or more additional computing nodes to the group that are part of a remote virtual computer network distinct from the one or more computer networks; and after receiving one or more additional requests from one or more computing systems for the provided type of functionality, selecting for each of the received additional requests one of the computing nodes of the modified group to respond to the additional request, such that at least one of the additional computing nodes is selected for at least one of the additional requests.

7. The method of claim 6 wherein the computing nodes that are part of the group before the initiating of the modification to the group each execute a copy of one or more software applications to provide the type of network-accessible functionality, and wherein the initiating of the modification to the group further includes initiating provisioning of the added one or more additional computing nodes, the provisioning including executing a copy of the one or more software applications on each of the added one or more additional computing nodes.

8. The method of claim 7 wherein the initiating of the modification to the group further includes initiating providing one or more logical storage volumes for use by the executing software application copies on the added one or more additional computing nodes.

9. The method of claim 6 wherein the one or more defined criteria for the group are further based in part on a cost of using at least one of the one or more computing nodes of the group and of the added one or more additional computing nodes.

10. The method of claim 9 wherein the cost of using the at least one computing nodes of the group and of the added one or more additional computing nodes is at least one of a monetary cost and an environmental cost.

11. The method of claim 6 wherein the one or more computer networks are under control of a first entity, wherein the first entity is one of multiple clients of a configurable network service under control of a distinct second entity, the configurable network service enabling the clients to each configure one or more of multiple virtual computer networks provided by the configurable network service on behalf of the clients, and wherein the virtual computer network is one of the multiple virtual computer networks provided by the configurable network service.

12. The method of claim 11 wherein the one or more computer networks are at a first geographical location, and wherein the virtual computer network is at a remote second geographical location and is a virtual extension to at least one of the one or computer networks.

13. The method of claim 11 wherein the one or more computer networks are at a first geographical location, and wherein the virtual computer network includes computing nodes at multiple geographical locations distinct from the first geographical location.

14. The method of claim 11 wherein, after the adding of the one or more additional computing nodes to the group that are part of the remote virtual computer network, the group of multiple computing nodes includes one or more computing nodes under control of the first entity and includes computing nodes under control of multiple distinct remote network-accessible services that are provided for use by the first entity.

15. The method of claim 11 wherein the one or more computer networks are at a first geographical location, wherein the virtual computer network is at a remote second geographical location, and wherein the one or more computing devices providing the load balancing capabilities are at the remote second location and are provided to the first entity by the configurable network service for use in providing the load balancing capabilities for the group of multiple computing nodes.

16. The method of claim 11 wherein the one or more additional computing nodes are each a virtual machine hosted on one of multiple physical computing systems of the configurable network service, and wherein the adding of the one or more additional computing nodes to the group includes configuring one or more virtual machine manager modules that execute on one or more of the physical computing systems to manage communications for the hosted virtual machines so that the hosted virtual machines are included as part of the virtual computer network.

17. The method of claim 6 wherein the selecting for each of the received additional requests of a computing node of the modified group to respond to the additional request includes forwarding the additional request to the selected computing node to initiate providing of the type of functionality from the selected computing node to a computer system from which the additional request is received, and wherein the method further comprises, under control of one of the at least one additional computing nodes that is selected for the at least one additional requests, receiving the at least one additional requests that are forwarded from the one or more computing devices, and in response to each of the at least additional requests, providing the type of network-accessible functionality to a computing system that is not part of the group that initiated the additional request.

18. The method of claim 6 wherein the initiating of the modification to the group further includes initiating providing one or more specified types of computing-related resources as part of the remote virtual computer network for use by the added one or more additional computing nodes.

19. The method of claim 6 wherein the multiple computing nodes of the group are associated with a first user, wherein the first user specifies the defined criteria for the group before the receiving of the one or more requests, and wherein the one or more defined criteria for the group are further based in part on demand that is predicted by the first user for use of computing resources by the computing nodes of the group.

20. The method of claim 6 wherein the one or more defined criteria for the group are based on the status information for the one or more computing nodes indicating that a computing load of the one or more computing nodes has exceeded one or more defined thresholds.

21. The method of claim 6 wherein the one or more defined criteria for the group are based on the status information for the one or more computing nodes indicating a current level of use of one or more types of computing resources by the one or more computing nodes, the current level of use of the one or more types of computing resources by the one or more computing nodes including one or more of a volume of requests being received by each of the one or more computing nodes, a degree of network utilization of each of the one or more computing nodes, a degree of network latency for each of the one or more computing nodes, a degree of latency in responding to requests for each of the one or more computing nodes a degree of processor utilization for each of the one or more computing nodes, a degree of memory utilization for each of the one or more computing nodes, and a degree of input/output bandwidth utilization for each of the one or more computing nodes.

22. The method of claim 6 further comprising automatically obtaining the status information for the one or more computing nodes before the determining that the one or more defined criteria for the group are satisfied.

23. The method of claim 6 wherein the group of computing nodes has multiple associated criteria and has multiple associated actions, wherein each of the actions are associated with at least one of the multiple associated criteria such that the action is to be performed when the at least one associated criteria for that action are satisfied, and wherein one of the multiple associated actions is to perform the adding of the one or more additional computing nodes to the group from the remote virtual computer network, the one action being associated with the one or more defined criteria.

24. The method of claim 6 further comprising, after the initiating of the modification to the group of computing nodes, automatically determining that one or more other defined criteria for the group are satisfied, and initiating a further modification to the group of computing nodes that includes removing from the group one or more computing nodes that are part of the virtual computer network.

25. A method for a computing system to provide load balancing capabilities, the method comprising:
  receiving, by a load balancer device, configuration information for a group of multiple computing nodes that are part of a physical network of a first user, the received configuration information indicating a remote configurable virtual computer network that is an extension to the physical network, the multiple computing nodes of the group being alternatives for providing a common type of network-accessible functionality to other computing systems and each executing a copy of a software application for use in the providing of the common type of functionality, the remote virtual computer network being provided to the first user by a remote configurable network service operated by an entity distinct from the first user, the configuration information further indicating defined criteria for the group of multiple computing nodes for use in determining when to use the indicated virtual computer network as part of modifying a quantity of the multiple computing nodes of the group, the defined criteria being based at least in part on current status information for one or more of the computing nodes of the group that indicates that a load of the one or more computing nodes has exceeded a defined threshold; and
  under control of the load balancer device after it is configured with the received configuration information, providing load balancing capabilities for the group of multiple computing nodes by:
    for each of one or more requests received from one or more of the other computing systems for the provided common type of functionality, selecting one of the computing nodes of the group to respond to the request and forwarding the request to the selected one computing node;
    after the receiving of the one or more requests, automatically determining that the defined criteria for the group are satisfied, automatically determining one or more modifications to the group of computing nodes that will add one or more additional computing nodes to the group, and automatically initiating the determined modifications to the group of computing nodes by interacting with a programmatic interface of the configurable network service to cause the one or more additional computing nodes to be added to the indicated virtual computer network in such a manner that the additional computing nodes are available for use with the group; and
    for each of one or more additional requests that are received after the automatic initiating of the determined modifications to the group, the one or more additional requests being received from one or more of the other computing systems for the provided common type of functionality, selecting one of the computing nodes of the modified group to respond to the additional request and forwarding the request to the selected one computing node, such that at least one of the additional computing nodes is selected for at least one of the additional requests.

26. The method of claim 1 further comprising, under control of one or more computing systems that provide the configurable network service, and for the load balancer device:
  receiving one or more requests from the load balancer device via the programmatic interface of the configurable network service, the received one or more requests indicating the configurable virtual computer network that is an extension to the physical network of the first user, the indicated virtual computer network being one of multiple virtual computer networks provided by the configurable network service to multiple remote clients, the first user being one of the multiple remote clients, and indicating one or more operations to be performed with respect to the indicated virtual computer network on behalf of the first user, the indicated one or more operations including causing one or more computing nodes to be added to the indicated virtual computer network and including provisioning the one or more added computing nodes of the indicated virtual computer network to execute the software application for use in the providing of the common type of functionality; and
  in response to the one or more requests,
    automatically selecting one or more of a plurality of computing nodes provided by the configurable network service that are not currently part of any of the multiple virtual computer networks, and assigning the selected computing nodes to the indicated virtual computer network, such that the first user has access to the assigned computing nodes via the indicated virtual computer network; and
    provisioning the selected one or more computing nodes to execute the software application, such that the provisioned one or more computing nodes of the indicated virtual computer network are ready to receive and handle forwarded requests for the provided common type of functionality from other computing systems.

27. The method of claim 1 wherein the configurable network service is a fee-based service that is accessible to remote clients via public networks and that provides multiple virtual computer networks using cloud computing techniques, and wherein the first user is one of the remote clients and provides payment to the configurable network service for the interacting with the programmatic interface of the configurable network service to cause the one or more additional computing nodes to be added to the configurable virtual computer network provided to the first user.

28. A computing device configured to provide load balancing capabilities, comprising:
one or more computer processors; and
a load balancer module that is configured to, when executed by at least one of the one or more computer processors, automatically provide load balancing capabilities for functionality available from a group of computing nodes of a computer network, by
receiving at least one request for the available functionality, and selecting at least one of the computing nodes of the group to handle the at least one request;
automatically determining to modify a quantity of the computing nodes of the group based at least in part on one or more defined criteria for the group being satisfied, and initiating the determined modifying, the determined modifying including modifying use as part of the group of one or more computing nodes of a virtual computer network associated with the computer network; and
after the initiating of the determined modifying of the quantity of the computing nodes, receiving at least one additional request for the available functionality, and selecting at least one of the computing nodes of the group to handle the at least one additional request, such that at least one of the one or more computing nodes of the virtual computer network whose use as part of the group is modified is selected for the at least one additional request.

29. The computing device of claim 28 wherein the computing nodes of the group are associated with a first entity that specifies the defined criteria for the group, wherein the defined criteria are based at least in part on status information obtained about one or more of the computing nodes that are part of the group before the initiating of the determined modifying, wherein the determined modifying of the quantity of the computing nodes includes adding the one or more computing nodes of the virtual computer network to the group, wherein the computing nodes of the group each execute a copy of one or more software applications to provide the available functionality, and wherein the received at least one request and the received at least one additional request are from one or more computing systems that are not part of the group to obtain the available functionality from the one or more software applications.

30. The computing device of claim 28 wherein the computing nodes that are part of the group before the initiating of the determined modifying are at a first geographical location and are under control of a first entity, wherein the virtual computer network is a virtual extension to the computer network at a remote second geographical location and is under control of a distinct second entity, wherein the second entity provides a network-accessible service that enables clients to configure virtual computer networks provided by the network-accessible service on behalf of the clients, wherein the first entity is one of the clients of the network-accessible service, and wherein the virtual computer network extension is one of the virtual computer networks provided by the network-accessible service.

31. The computing device of claim 28 wherein the modifying of use as part of the group of the one or more computing nodes of the virtual computer network includes adding the one or more computing nodes of the virtual computer network to the group, and wherein the group of computing nodes did not include any computing nodes of the virtual computer network before the adding of the one or more computing nodes.

32. The computing device of claim 28 wherein the modifying of use as part of the group of the one or more computing nodes of the virtual computer network includes removing the one or more computing nodes of the virtual computer network from the group, and wherein the group of computing nodes does not include any computing nodes of the virtual computer network after the removing of the one or more computing nodes.

33. The computing device of claim 28 wherein the load balancer module includes software instructions for execution by the computing device.

* * * * *